United States Patent
Zhao et al.

(10) Patent No.: US 11,412,483 B2
(45) Date of Patent: Aug. 9, 2022

(54) INFORMATION SENDING METHOD, INFORMATION RECEIVING METHOD, AND DEVICE

(71) Applicant: HUAWEI TECHNOLOGIES CO., LTD., Guangdong (CN)

(72) Inventors: Yue Zhao, Beijing (CN); Zheng Yu, Beijing (CN); Yongqiang Fei, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 10 days.

(21) Appl. No.: 17/062,804

(22) Filed: Oct. 5, 2020

(65) Prior Publication Data

US 2021/0022119 A1    Jan. 21, 2021

Related U.S. Application Data

(63) Continuation of application No. PCT/CN2018/082065, filed on Apr. 5, 2018.

(51) Int. Cl.
*H04W 72/04* (2009.01)
*H04L 41/0803* (2022.01)

(52) U.S. Cl.
CPC ......... *H04W 72/04* (2013.01); *H04L 41/0803* (2013.01)

(58) Field of Classification Search
None
See application file for complete search history.

(56) References Cited

U.S. PATENT DOCUMENTS

| | | | |
|---|---|---|---|
| 2016/0112898 A1* | 4/2016 | Chen | H04W 28/0215 370/235 |
| 2017/0013565 A1* | 1/2017 | Pelletier | H04W 52/365 |
| 2017/0135098 A1* | 5/2017 | Kang | H04W 72/0446 |

(Continued)

FOREIGN PATENT DOCUMENTS

| | | |
|---|---|---|
| CN | 102036310 A | 4/2011 |
| CN | 104105162 A | 10/2014 |
| EP | 3745794 A1 | 12/2020 |
| EP | 3767852 A1 | 1/2021 |
| WO | 2016183717 A1 | 11/2016 |

OTHER PUBLICATIONS

3GPP TS 36.213 V15.1.0 (Mar. 2018), "3rd Generation Partnership Project; Technical Specification Group Radio Access Network; Evolved Universal Terrestrial Radio Access (E-UTRA); Physical layer procedures(Release 15)," Mar. 2018, 501 pages.

(Continued)

*Primary Examiner* — Kenny S Lin
(74) *Attorney, Agent, or Firm* — Fish & Richardson P.C.

(57) ABSTRACT

The present disclosure relates to information sending methods, information receiving methods, and devices. One example information sending method includes receiving, by a terminal device, a first transport block size (TBS) value from a network device, where the first TBS value is included in a second TBS set, the second TBS set includes N TBSs values, and N is a positive integer greater than 1, determining, by the terminal device, a third TBS set based on the first TBS value, where a largest TBS value in the third TBS set is less than or equal to the first TBS value, selecting, by the terminal device, a TBS value from the third TBS set, and sending uplink information based on the selected TBS value.

16 Claims, 5 Drawing Sheets

(56) References Cited

U.S. PATENT DOCUMENTS

2017/0280481 A1* 9/2017 Stern-Berkowitz ........................ H04L 1/1854
2018/0007658 A1  1/2018 Shen et al.
2020/0068608 A1* 2/2020 Ye ...................... H04W 72/048
2020/0374920 A1* 11/2020 Tie .................... H04W 74/0833
2020/0413389 A1* 12/2020 Liu ....................... G16Y 10/75
2021/0136826 A1* 5/2021 Chang .................. H04W 72/02

OTHER PUBLICATIONS

3GPP TS 36.331 V15.1.0 (Mar. 2018), "3rd Generation Partnership Project; Technical Specification Group Radio Access Network; Evolved Universal Terrestrial Radio Access (E-UTRA); Radio Resource Control (RRC); Protocol specification (Release 15)," Mar. 2018, 786 pages.

3GPP TS 36.213 V14.3.0 (Jun. 2017), "3rd Generation Partnership Project; Technical Specification Group Radio Access Network; Evolved Universal Terrestrial Radio Access (E-UTRA);Physical layer procedures(Release 14)," Jun. 2017, 460 pages.

PCT International Search Report and Written Opinion issued in International Application No. PCT/CN2018/082065 dated Mar. 6, 2019, 10 pages (with English translation).

Extended European Search Report issued in European Application No. 18913760.7 dated Feb. 15, 2021, 10 pages.

MediaTek Inc., "On NB-IoT EDT indication via PRACH," 3GPP TSG RAN WG1 Meeting #91, R1-1719592, Reno, Nevado, USA, Nov. 27-Dec. 1, 2017, 5 pages.

Office Action issued in Canadian Application No. 3,095,944 dated Oct. 22, 2021, 6 pages.

\* cited by examiner

INFORMATION SENDING METHOD, INFORMATION RECEIVING METHOD, AND DEVICE

CROSS-REFERENCE TO RELATED APPLICATIONS

This application is a continuation of international Application No. PCT/CN2018/082065, filed on Apr. 5, 2018, the disclosure of which is hereby incorporated by reference in its entirety.

TECHNICAL FIELD

Embodiments of this application relate to the communications field, and in particular, to an information sending method, an information receiving method, and a device.

BACKGROUND

Currently, wireless communications systems are applied and deployed on a large scale, and may provide a plurality of users with various types of communication, for example, voice, data, and multimedia services.

In a discussion process of a current long term evolution (long term evolution, LTE) technology, uplink user data may be transmitted by using a third message, namely, Msg3, in a random access process, and a media access control (medium access control, MAC) random access response (random access responses, RAR) is used.

In the prior art, a MAC protocol data unit (protocol data units, PDU) includes a MAC header (header), zero or a plurality of MAC RARs, and an optional padding part. In the prior art, a largest transport block size (transport block size, TBS) of a terminal device may be configured on a network, so that the terminal device can use only the largest TBS to transmit Msg3. However, not all terminal devices need to use the largest TBS. If a TBS required by a terminal device is less than the largest TBS configured on the network, the terminal device needs to add a padding bit to Msg3, to expand a capacity of Msg3 to the largest MS. When the terminal device sends data in such a manner, a waste of transmission resources is caused, and a status on a network side is not considered.

SUMMARY

Embodiments of this application provide an information sending method, an information receiving method, and a device, so that a status on a network side can be considered as much as possible, and a waste of transmission resources can be avoided.

According to a first aspect, an embodiment of this application provides an information sending method, including:

receiving, by a terminal device, a first transport block size TBS configured by a network device, where the first TBS is a TBS selected by the network device from a second TBS set, the second TBS set includes N TBSs, and N is a positive integer greater than 1;

determining, by the terminal device, a third TBS set based on the first TBS, where a largest TBS in the third TBS set is less than or equal to the first TBS; and selecting, by the terminal device, a TBS from the third TBS set, and sending uplink information based on the selected TBS.

In this embodiment of this application, the network device may determine to configure the first TBS, so that the terminal device may determine the third TBS set based on the first TBS. The terminal device selects the TBS in the third TBS set to send the uplink information. Therefore, the terminal device has flexibility of selecting the TBS in the third TBS set. The terminal device sends the uplink information by using the TBS selected by the terminal device. The network device may determine, by using the third TBS set, the TBS selected by the terminal device, to receive the uplink information by using the TBS selected by the terminal device. The terminal device may select the TBS in the third TBS set, where the TBS is used to send the uplink information. Therefore, the TBS for sending the uplink information is flexibly selected, so that resource utilization is improved, and a waste of resources is avoided as much as possible.

In a possible design, the terminal device is at a coverage enhancement level 0 or a coverage enhancement level 1, or in a coverage enhancement mode A; and the second TBS set includes at least a TBS value 1000 and a TBS value 328; or the second TBS set includes at least a TBS value 1000 and a TBS value 320.

For example, when the terminal device uses the coverage enhancement mode A, the second TBS set may include eight TBSs. A largest TBS value in the eight TBSs is 1000, and a smallest TBS value is 328 or 320. Elements, namely, TBSs, included in the second TBS set are specifically determined with reference to an implementation scenario.

In a possible design, the TBS values included in the second TBS set are 328, 424, 536, 616, 712, 808, 904, and 1000; or the TBS values included in the second TBS set are 328, 440, 504, 600, 712, 808, 936, and 1000.

For example, according to a principle of being approximately uniformly spaced, six values that are between 328 and 1000 and that are approximately equi-spaced are selected. The second TBS set may include the values 328 and 1000 at two ends and the six values. The second TBS set may include the eight TBS values. The eight determined largest TBS values are approximately equi-spaced, and a quantity of padding bits is reduced.

In a possible design, the terminal device is at a coverage enhancement level 2 or a coverage enhancement level 3, or in a coverage enhancement mode B; and the second TBS set includes at least a TBS value 936 and a TBS value 328; or the second TBS set includes at least a TBS value 936 and a TBS value 320.

For example, when the terminal device uses the coverage enhancement mode B, the second TBS set may include eight TBSs. A largest TBS value in the eight TBSs is 936, and a smallest TBS value is 328 or 320. Elements, namely, TBSs, included in the second TBS set are specifically determined with reference to an implementation scenario.

In a possible design, the TBS values included in the second TBS set are 328, 408, 504, 584, 680, 776, 840, and 936;

the TBS values included in the second TBS set are 328, 408, 504, 584, 680, 776, 872, and 936;

the TBS values included in the second TBS set are 328, 392, 456, 504, 600, 712, and 936; or the TBS values included in the second TBS set are 328, 408, 456, 504, 600, 712, 808, and 936.

For example, according to a principle of being approximately uniformly spaced, six values that are between 328 and 936 and that are approximately equi-spaced are selected. The second TBS set may include the values 328 and 936 at two ends and the six values. The second TBS set may include the eight TBS values. The eight determined largest TBS values are approximately equi-spaced, and a quantity of padding bits is reduced.

In a possible design,
the third TBS set includes a fourth TBS, where the fourth TBS is the first TBS, or the fourth TBS is a TBS closest to the first TBS.

The closest TBS is in a column that is in a preset TBS table and that corresponds to a quantity of PRBs, and is closest to the first TBS value. The preset TBS table shows a relationship among a TBS index, the quantity of PRBs, and a TBS value in a standard.

In a possible design,
the third TBS set further includes M-1 TBSs, where M is a positive integer; and
the M-1 TBSs start from the fourth TBS, and are determined, in natural descending order of TBS indexes, in a column that is in a preset MS table and that corresponds to a quantity of PRBs;
the M-1 TBSs start from the fourth TBS, and are determined, based on equi-spaced TBS indexes, in a column that is in a preset TBS table and that corresponds to a quantity of PRBs; or
the M-1 TBSs start from the fourth TBS, and are determined, in head-to-tail alternate order of TBS indexes, in a column that is in a preset TBS table and that corresponds to a quantity of PRBs.

In addition to the fourth TBS, the third TBS set may further include the M-1 TBSs. That the M-1 TBSs are determined in natural descending order of TBS indexes means that the M-1 TBSs are determined, in descending order of the TBS indexes, in the column that is in the preset TBS table and that corresponds to the quantity of PRBs. That the M-1 TBSs are determined based on the equi-spaced TBS indexes means that the M-1 TBSs are determined by using a same spacing. That the M-1 TBSs are determined in head-to-tail alternate order of the TBS indexes means that largest TBSs and smallest TBSs in the third TBS set are adjacent, being head-to-tail alternate means that the largest TBSs and the smallest TBSs in the third TBS set are connected head-to-tail, and the M-1 TBSs may be determined based on this. In subsequent embodiments, a manner of determining the M-1 TBSs is described with reference to corresponding tables.

According to a second aspect, an embodiment of this application provides an information receiving method, including:
determining, by a network device, a third transport block size TBS set based on a first TBS configured for a terminal device, where a largest TBS in the third TBS set is less than or equal to the first TBS, the first TBS is a TBS selected by the network device from a second TBS set, the second TBS set includes N TBSs, and N is a positive integer greater than 1; and
receiving, by the network device based on the third TBS set, uplink information sent by the terminal device.

In a possible design,
the terminal device is at a coverage enhancement level 0 or a coverage enhancement level 1, or in a coverage enhancement mode A; and
the second TBS set includes at least a MS value 936 and a TBS value 328; or
the second TBS set includes at least a TBS value 936 and a TBS value 320.

In a possible design,
the TBS values included in the second TBS set are 328, 424, 536, 616, 712, 808, 904, and 1000; or
the TBS values included in the second TBS set are 328, 440, 504, 600, 712, 808, 936, and 1000.

In a possible design,
the terminal device is at a coverage enhancement level 2 or a coverage enhancement level 3, or in a coverage enhancement mode B; and
the second TBS set includes at least a TBS value 936 and a TBS value 328; or
the second TBS set includes at least a TBS value 936 and a TBS value 320.

In a possible design,
the TBS values included in the second TBS set are 328, 408, 504, 584, 680, 776, 840, and 936;
the TBS values included in the second TBS set are 328, 408, 504, 584, 680, 776, 872, and 936;
the TBS values included in the second TBS set are 328, 392, 456, 504, 600, 712, 808, and 936; or
the TBS values included in the second TBS set are 328, 408, 456, 504, 600, 712, 808, and 936.

In a possible design,
the third TBS set includes a fourth TBS, where the fourth ms is the first TBS, or the fourth TBS is a TBS closest to the first TBS.

In a possible design,
the third TBS set further includes M-1 TBSs, where M is a positive integer; and
the M-1 TBSs start from the fourth TBS, and are determined, in natural descending order of TBS indexes, in a column that is in a preset MS table and that corresponds to a quantity of PRBs;
the M-1 TBSs start from the fourth TBS, and are determined, based on equi-spaced. TBS indexes, in a column that is in a preset TBS table and that corresponds to a quantity of PRBs; or
the M-1 TBSs start from the fourth TBS, and are determined, in head-to-tail alternate order of TBS indexes, in a column that is in a preset TBS table and that corresponds to a quantity of PRBs.

According to a third aspect, an embodiment of this application provides a terminal device, including:
a receiving module, configured to receive a first transport block size TBS configured by a network device, where the first TBS is a TBS selected by the network device from a second TBS set, the second TBS set includes N TBSs, and N is a positive integer greater than 1;
a processing module, configured to determine a third TBS set based on the first TBS, where a largest TBS in the third TBS set is less than or equal to the first TBS; and
a sending module, configured to select a TBS from the third TBS set, and send uplink information based on the selected TBS.

In a possible design,
the terminal device is at a coverage enhancement level 0 or a coverage enhancement level 1, or in a coverage enhancement mode A; and the second TBS set includes at least a TBS value 1000 and a TBS value 328; or
the second TBS set includes at least a TBS value 1000 and a TBS value 320.

In a possible design,
the TBS values included in the second TBS set are 328, 424, 536, 616, 712, 808, 904, and 1000; or
the TBS values included in the second TBS set are 328, 440, 504, 600, 712, 808, 936, and 1000.

In a possible design, the terminal device is at a coverage enhancement level 2 or a coverage enhancement level 3, or in a coverage enhancement mode B; and the second TBS set includes at least a TBS value 936 and a TBS value 328; or the second TBS set includes at least a TBS value 936 and a TBS value 320.

In a possible design, the TBS values included in the second TBS set are 328, 408, 504, 584, 680, 776, 840, and 936;

the TBS values included in the second TBS set are 328, 408, 504, 584, 680, 776, 872, and 936;

the TBS values included in the second TBS set are 328, 392, 456, 504, 600, 712, 808, and 936; or the TBS values included in the second TBS set are 328, 408, 456, 504, 600, 712, 808, and 936.

In a possible design, the third TBS set includes a fourth TBS, where the fourth TBS is the first TBS, or the fourth TBS is a TBS closest to the first TBS.

In a possible design, the third TBS set further includes M-1 TBSs, where M is a positive integer; and the M-1 TBSs start from the fourth TBS, and are determined, in natural descending order of TBS indexes, in a column that is in a preset TBS table and that corresponds to a quantity of PRBs;

the M-1 TBSs start from the fourth TBS, and are determined, based on equi-spaced TBS indexes, in a column that is in a preset TBS table and that corresponds to a quantity of PRBs; or the M-1 TBSs start from the fourth TBS, and are determined, in head-to-tail alternate order of TBS indexes, in a column that is in a preset TBS table and that corresponds to a quantity of PRBs.

In the third aspect of this application, the compositional modules of the terminal device may further perform the steps described in the first aspect and the possible implementations. For details, refer to the foregoing descriptions of the first aspect and the possible implementations.

According to a fourth aspect, an embodiment of this application provides a network device, including:

a processing module, configured to determine a third transport block size TBS set based on a first TBS configured for a terminal device, where a largest TBS in the third TBS set is less than or equal to the first TBS, the first TBS is a TBS selected by the network device from a second TBS set, the second TBS set includes N TBSs, and N is a positive integer greater than 1; and a receiving module, configured to receive, based on the third TBS set, uplink information sent by the terminal device.

In a possible design, the terminal device is at a coverage enhancement level 0 or a coverage enhancement level 1, or in a coverage enhancement mode A; and the second TBS set includes at least a TBS value 936 and a TBS value 328; or the second TBS set includes at least a TBS value 936 and a TBS value 320.

In a possible design, the TBS values included in the second TBS set are 328, 424, 536, 616, 712, 808, 904, and 1000; or the TBS values included in the second TBS set are 328, 440, 504, 600, 712, 808, 936, and 1000.

In a possible design, the terminal device is at a coverage enhancement level 2 or a coverage enhancement level 3, or in a coverage enhancement mode B; and the second TBS set includes at least a TBS value 936 and a TBS value 328; or the second TBS set includes at least a TBS value 936 and a TBS value 320, In a possible design, the TBS values included in the second TBS set are 328, 408, 504, 584, 680, 776, 840, and 936;

the TBS values included in the second TBS set are 328, 408, 504, 584, 680, 776, 872, and 936;

the TBS values included in the second TBS set are 328, 392, 456, 504, 600, 712, 808, and 936; or the TBS values included in the second TBS set are 328, 408, 456, 504, 600, 712, 808, and 936.

In a possible design, the third TBS set includes a fourth TBS, where the fourth TBS is the first TBS, or the fourth TBS is a TBS closest to the first TBS.

In a possible design, the third TBS set further includes M-1 TBSs, where M is a positive integer; and the M-1 TBSs start from the fourth TBS, and are determined, in natural descending order of TBS indexes, in a column that is in a preset TBS table and that corresponds to a quantity of PRBs;

the M-1 TBSs start from the fourth TBS, and are determined, based on equi-spaced TBS indexes, in a column that is in a preset TBS table and that corresponds to a quantity of PRBs; or the M-1 TBSs start from the fourth TBS, and are determined, in head-to-tail alternate order of TBS indexes, in a column that is in a preset TBS table and that corresponds to a quantity of PRBs.

In the fourth aspect of this application, the compositional modules of the network device may further perform the steps described in the second aspect and the possible implementations. For details, refer to the foregoing descriptions of the second aspect and the possible implementations.

According to a fifth aspect, an embodiment of this application provides a computer-readable storage medium. The computer-readable storage medium stores an instruction. When the instruction is run on a computer, the computer is enabled to perform the methods according to the foregoing aspects.

According to a sixth aspect, an embodiment of this application provides a computer program product including an instruction. When the computer program product runs on a computer, the computer is enabled to perform the methods according to the foregoing aspects.

According to a seventh aspect, an embodiment of this application provides a communications apparatus. The communications apparatus may include an entity such as a terminal device, a network device, or a chip. The communications apparatus includes a processor and a memory. The memory is configured to store an instruction. The processor is configured to execute the instruction in the memory, so that the communications apparatus performs the method according to either of the first aspect and second aspect.

According to an eighth aspect, this application provides a chip system. The chip system includes a processor, configured to support a network device or a terminal device in implementing the functions in the foregoing aspects, for example, sending or processing data and/or information in the foregoing methods. In a possible design, the chip system further includes a memory. The memory is configured to store a program instruction and data that are necessary for the network device. The chip system may include a chip, or may include a chip and another discrete component.

DESCRIPTION OF EMBODIMENTS

Figure 1:
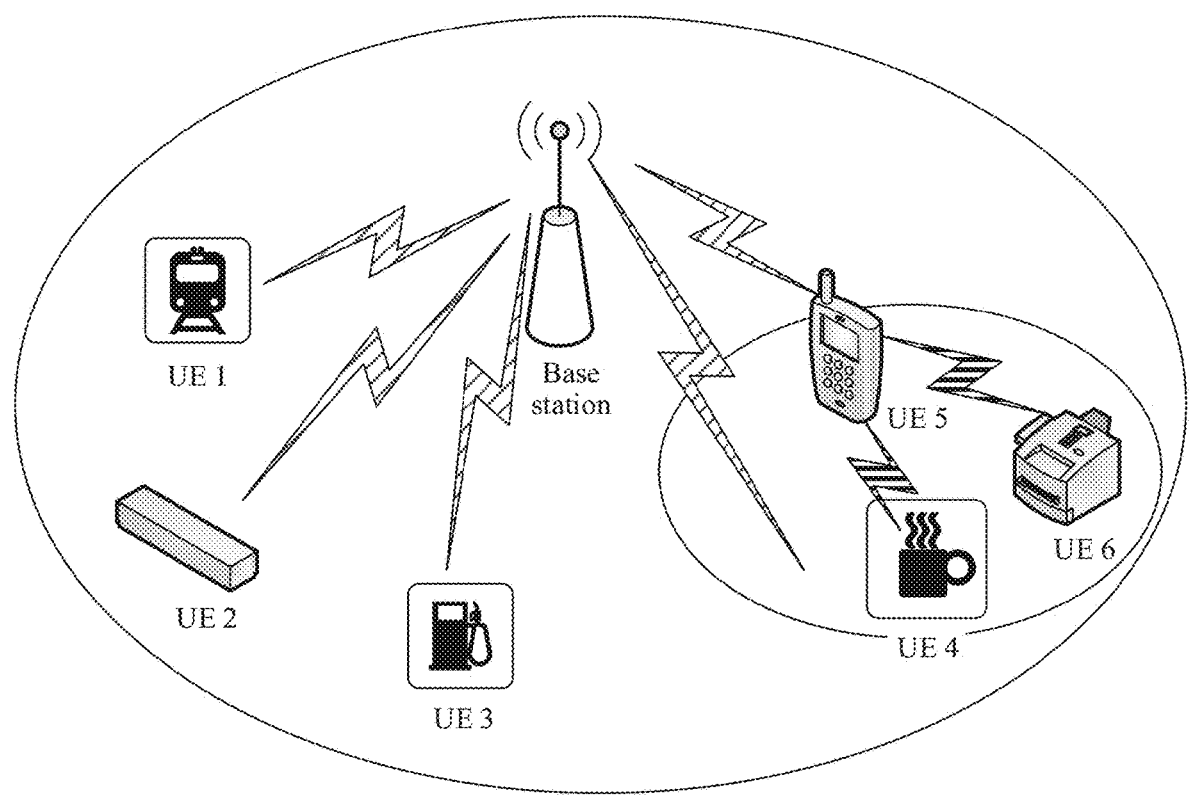
FIG. 1 is a schematic diagram of a system architecture corresponding to an information sending method and an information receiving method according to an embodiment of this application.

Embodiments of this application provide an information sending method, an information receiving method, and a device, so that a status on a network side can be considered as much as possible, and a waste of transmission resources can be avoided.

In the specification, the claims, and the accompanying drawings of this application, the terms "first", "second", and the like are intended to distinguish between similar objects but are not necessarily used to describe a specific order or sequence. It should be understood that, the terms used in such a way are interchangeable in proper circumstances, which is merely a discrimination manner used when objects having a same attribute are described in the embodiments of this application. In addition, the terms "include", "have", and any variant thereof are intended to cover a non-exclusive inclusion, so that processes, methods, systems, products, or devices that include a series of units are not necessarily limited to those units, but may include other units not expressly listed or inherent to these processes, methods, systems, products, or devices.

The technical solutions in the embodiments of the present invention may be applied to various communications systems for data processing, for example, a code division multiple access (code division multiple access, CDMA) system, a time division multiple access (time division multiple access. TDMA) system, a frequency division multiple access (frequency division multiple access, FDMA) system, an orthogonal frequency division multiple access (orthogonal frequency-division multiple access, OFDMA) system, a single-carrier frequency division multiple access (single carrier, FDMA, SC-FDMA) system, and another system. The terms "system" and "network" may be interchanged with each other. Wireless technologies such as universal terrestrial radio access (universal terrestrial radio access, UTRA) and CDMA2000 may be implemented in the CDMA system. UTRA may include a wideband CDMA (wideband CDMA, WCDMA) technology and another variant technology of CDMA. CDMA2000 may cover the interim standard (interim standard, IS) 2000 (IS-2000), IS-95, and IS-856 standards. A wireless technology such as global system for mobile communications (global system for mobile communication, GSM) may be implemented in the TDMA system. Wireless technologies such as evolved universal terrestrial radio access (evolved UTRA, E-UTRA), ultra mobile broadband (ultra mobile broadband, UMB), IEEE 802.11 (Wi-Fi), IEEE 802.16 (WiMAX), IEEE 802.20, and Flash OFDM may be implemented in the OFDMA system. The UTRA and the E-UTRA are evolved versions of the UMTS. 3GPP is a new version of UMTS using E-UTRA in long term evolution (long term evolution, LTE) and various versions evolved based on LTE. A 5th generation (5 Generation, "5G" for short) communications system and a new radio (New Radio, "NR" for short) system are next-generation communications systems that are under research. In addition, the communications system may further be applicable to a future-oriented communications technology, which is applicable to the technical solutions provided in the embodiments of the present invention. A system architecture and a service scenario that are described in the embodiments of the present invention are intended to describe the technical solutions in the embodiments of the present invention more clearly, and do not constitute a limitation on the technical solutions provided in the embodiments of the present invention. A person of ordinary skill in the art may know that, with evolution of a network architecture and emergence of a new service scenario, the technical solutions provided in the embodiments of the present invention are also applicable to similar technical problems.

FIG. 1 is a schematic structural diagram of a possible radio access network (radio access network, RAN for short) according to an embodiment of this application. The RAN may be a base station access system on a 2G network (to be specific, the RAN includes a base station and a base station controller), may be a base station access system on a 3G network (to be specific, the RAN includes a base station and an RNC), may be a base station access system on a 4G network (to be specific, the RAN includes an eNB and an RNC), or may be a base station access system on a 5G network, The RAN includes one or more network devices. The network device may be any type of device having a wireless transceiver function, or a chip disposed in a device having a wireless transceiver function. The network device includes but is not limited to a base station (for example, a base station BS, a NodeB, an evolved NodeB eNodeB or eNB, a gNodeB or gNB in a 5th generation 5G communications system, a base station in a future communications system, an access node in a Wi-Fi system, a wireless relay node, or a wireless backhaul node) and the like. The base station may be a macro base station, a micro base station, a picocell base station, a small cell, a relay station, or the like. A plurality of base stations may support a network using the foregoing one or more technologies or a future evolved network. A core network may support the network using the foregoing one or more technologies or the future evolved network. The base station may include one or more co-site or non-co-site transmission reception points (Transmission receiving point, TRP). The network device may alternatively be a radio controller, a central unit (centralized unit, CU), a distributed unit (distributed unit, DU), or the like in a cloud radio access network (cloud radio access network, GRAN) scenario. The network device may alternatively be a server, a wearable device, a vehicle-mounted device, or the like. That the network device is a base station is used as an example for description below. The plurality of network devices may be base stations of a same type or base stations of different types. The base station may communicate with terminal devices 1 to 6, or may communicate with terminal devices 1 to 6 by using a relay station. The terminal devices 1 to 6 may support communication with a plurality of base stations using different technologies. For example, the terminal device may support communication with a base station supporting an LTE network, may support communication with a base station supporting the 5G network, or may support a dual-connection to a base station supporting an LTE network and a base station supporting the 5G network. For example, the terminal is connected to a radio access network (radio access network, RAN) node of a wireless network. Currently, for example, the RAN node is a gNB, a transmission reception point (transmission reception point, TRP), an evolved NodeB (evolved NodeB, eNB), a radio network controller (radio network controller, RNC), a NodeB (NodeB, NB), a base station controller (base station controller, BSC), a base transceiver station (base transceiver station, BTS), a home base station (for example, a home evolved NodeB or a home NodeB, HNB), a baseband unit (base band unit, BBU), or a wireless fidelity (wireless fidelity, Wi-Fi) access point (access point, AP). In a network structure, the network device may include a central unit (centralized unit, CU) node or a distributed unit (distributed unit, DU) node, or may be a RAN device including a CU node and a DU node.

The terminal devices 1 to 6 each are also referred to as user equipment (user equipment, UE), a mobile station (mobile station, MS), a mobile terminal (mobile terminal, MT), a terminal, or the like. The terminal devices 1 to 6 each are a device that provides voice and/or data connectivity for a user or a chip disposed in the device, for example, a handheld device or a vehicle-mounted device that has a wireless connection function. Currently, for example, the terminal device is a mobile phone (mobile phone), a tablet computer, a notebook computer, a palmtop computer, a mobile interact device (mobile internet device, MID), a wearable device, a virtual reality (virtual reality, VR) device, an augmented reality (augmented reality, AR) device, a wireless terminal in industrial control (industrial control), a wireless terminal in self driving (self driving), a wireless terminal in remote medical surgery (remote medical surgery), a wireless terminal in a smart grid (smart grid), a wireless terminal in transportation safety (transportation safety), a wireless terminal in a smart city (smart city), or a wireless terminal in a smart home (smart home).

In this embodiment of this application, a communications system includes the base station and the UE 1 to the UE 6. In the communications system, the base station sends one or more of system information, a RAR message, and a paging message to one or more of the UE 1 to the UE 6. In addition, alternatively, a communications system includes the UE 4 to the UE 6. In the communications system, the UE 5 may function as a base station. The UE 5 may send one or more of system information, control information, and a paging message to one or more of the UE 4 and the UE 6.

Figure 2:
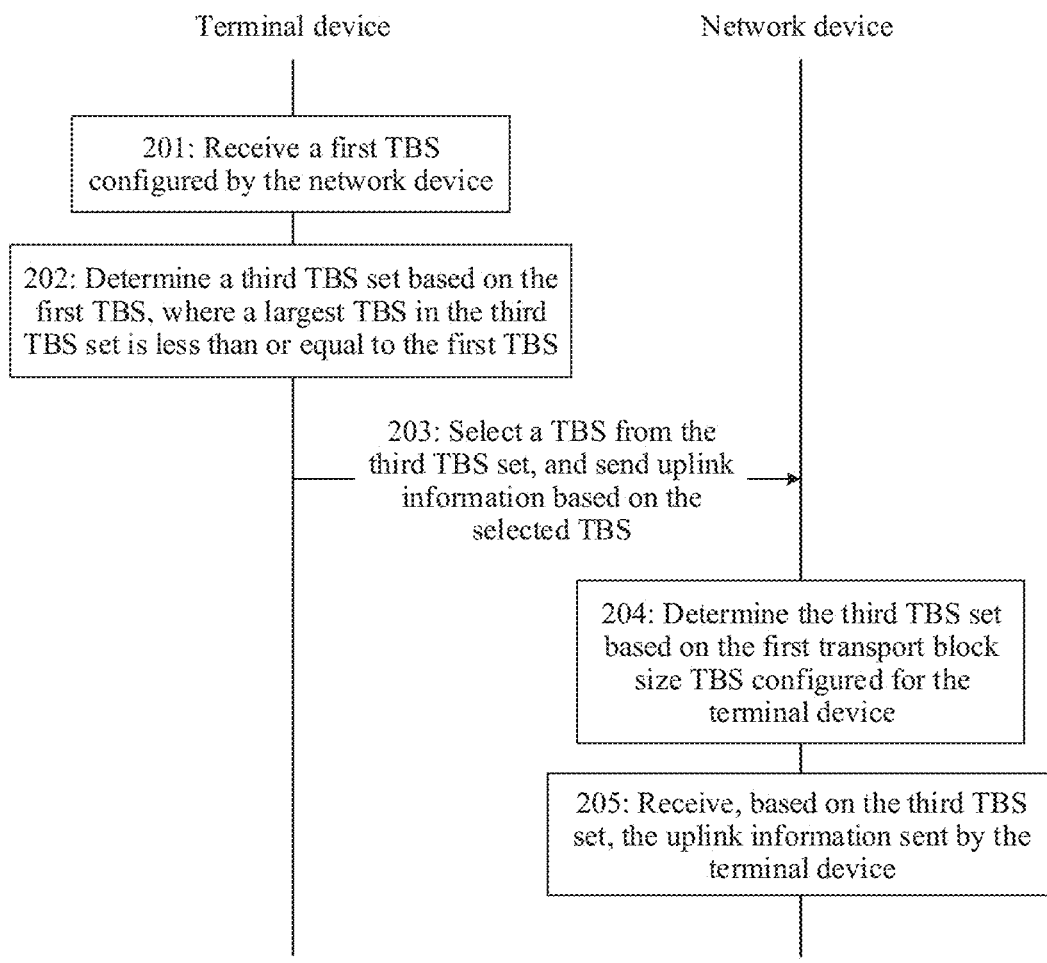
FIG. 2 is a schematic flowchart of interaction between a terminal device and a network device according to an embodiment of this application.

FIG. 2 is a schematic flowchart of interaction between a network device and a terminal device according to an embodiment of this application. An information transmission method provided in this embodiment of this application mainly includes the following steps.

201: The terminal device receives a first transport block size TBS configured by the network device, where the first TBS is a TBS selected by the network device from a second TBS set, the second TBS set includes N TBSs, and N is a positive integer greater than 1.

For example, a value of N may be equal to 8. The network device selects a MS from the second TBS set as the first TBS. For example, when the terminal device uses a coverage enhancement mode A, a largest MS in the second TBS set may be 1000, and a smallest TBS in the second TBS set may be 328 or 320. Six values that are between 328 and 1000 and that are approximately equi-spaced are selected, so that the second TBS set is {328, 424, 536, 616, 712, 808, 904, 1000}.

For another example, when the terminal device uses a coverage enhancement mode B, a largest TBS in the second TBS set may be 936, and a smallest TBS in the second TBS set may be 328 or 320. Then, six values that are between 328 and 936 and that are approximately equi-spaced are selected, so that the second TBS set is {328, 408, 504, 584, 680, 776, 808, 936}. The first TBS may be a TBS value in the second TBS set.

202: The terminal device determines a third TBS set based on the first TBS, where a largest TBS in the third TBS set is less than or equal to the first TBS.

The third TBS set is determined based on the first TBS. For example, for TBS values in the third TBS set, a TBS less than or equal to the first TBS may be selected from the second TBS set to constitute the third. TBS set. This is not limited, and the third TBS set may alternatively not be selected from the second TBS set. Instead, the third TBS set is determined based on the first TBS and with reference to a preset TBS table.

203: The terminal device selects a TBS from the third TBS set, and sends uplink information based on the selected TBS.

After determining the third TBS set, the terminal device selects a TBS based on a size of a message to be sent, and sends the uplink information to the network device based on the selected TBS.

204: The network device determines the third TBS set based on the first transport block size TBS configured for the terminal device, where the first TBS is the TBS selected by the network device from the second TBS set, the second TBS set includes the N TBSs, and N is a positive integer greater than 1

For example, the value of N may be 8. The first TBS may be a largest TBS configured by a system. The first TBS may be selected from the second TBS set.

205: The network device receives, based on the third TBS set, the uplink information sent by the terminal device.

The network device performs blind detection based on the third TBS set, to determine a TBS to be used by the terminal device, so that the terminal device sends the uplink information by using the determined TBS.

It can be learned from the example descriptions in the foregoing embodiment that, the network device in this embodiment of this application may determine to configure the first TBS, so that the terminal device may determine the third TBS set based on the first TBS. The terminal device selects the TBS in the third TBS set to send the uplink information. Therefore, the terminal device has flexibility of selecting the TBS in the third TBS set. The terminal device sends the uplink information by using the TBS selected by the terminal device. The network device may determine, by using the third TBS set, the TBS selected by the terminal device, to receive the uplink information by using the TBS selected by the terminal device. The terminal device in this embodiment of this application may select the TBS in the third MS set, where the MS is used to send the uplink information. Therefore, the TBS for sending the uplink information is flexibly selected, so that resource utilization is improved, and a waste of resources is avoided as much as possible.

Figure 3:
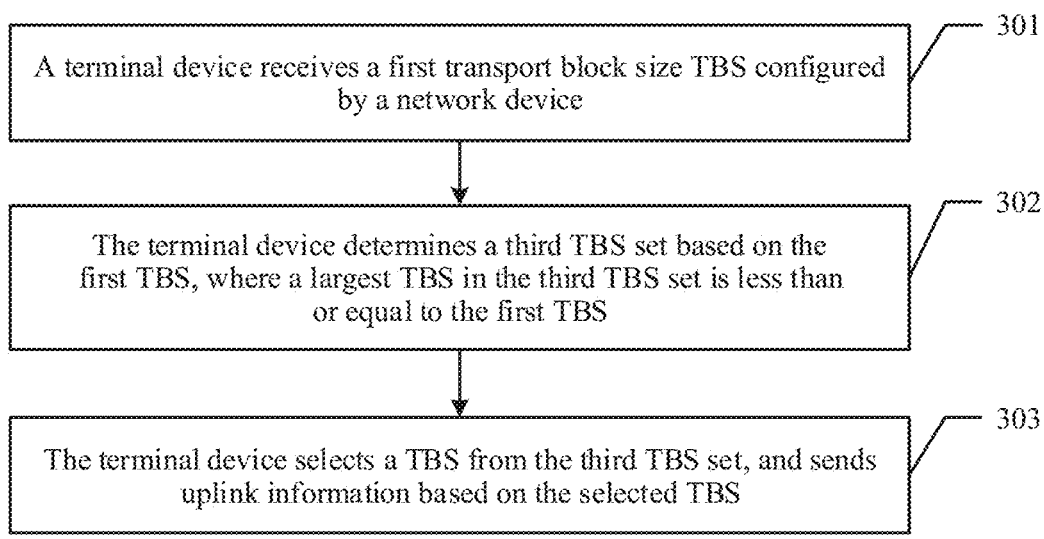
FIG. 3 is a schematic block flowchart of an information sending method according to an embodiment of this application.

The following separately describes, from perspectives of a terminal device and a network device, the methods provided in the embodiments of this application. First, referring to FIG. 3, an embodiment of this application provides an information sending method, including the following steps.

301: The terminal device receives a first transport block size TBS configured by the network device, where the first TBS is a TBS selected by the network device from a second TBS set, the second TBS set includes N TBSs, and N is a positive integer greater than 1.

For example, a value of N may be equal to 8. The network device selects a TBS from the second TBS set as the first TBS. For example, when the terminal device uses a coverage enhancement mode A, a largest TBS in the second TBS set may be 1000, and a smallest TBS in the second TBS set may be 328 or 320. Six values that are between 328 and 1000 and that are approximately equi-spaced are selected, so that the second TBS set is {328, 424, 536, 616, 712, 808, 904, 1000}.

For another example, when the terminal device uses a coverage enhancement mode B, a largest TBS in the second MS set may be 936, and a smallest TBS in the second TBS set may be 328 or 320. Then, six values that are between 328 and 936 and that are approximately equi-spaced are selected, so that the second TBS set is {328, 408, 504, 584, 680, 776, 808, 936} The first TBS may be a TBS value in the second TBS set.

302: The terminal device determines a third TBS set based on the first TBS, where a largest TBS in the third TBS set is less than or equal to the first TBS.

In some embodiments of this application, the terminal device is at a coverage enhancement level 0 or a coverage enhancement level 1, or in the coverage enhancement mode A; and the second TBS set includes at least a TBS value 1000 and a TBS value 328; or the second TBS set includes at least a TBS value 1000 and a TBS value 320.

For example, the second TBS set may include eight TBSs. A largest TBS value in the eight TBSs is 1000, and a smallest TBS value is 328 or 320. Elements, namely, TBSs, included in the second TBS set are specifically determined with reference to an implementation scenario.

In some embodiments of this application, the MS values included in the second TBS set are 328, 424, 536, 616, 712, 808, 904, and 1000; or the TBS values included in the second TBS set are 328, 440, 504, 600, 712, 808, 936, and 1000.

For example, six values that are between 328 and 1000 and that are approximately equi-spaced are selected. The second TBS set may include the values 328 and 1000 at two ends and the six values. The second TBS set may include the eight TBS values. The eight determined largest TBS values are approximately equi-spaced, so that a quantity of padding bits can be reduced, with approximately equal probabilities, for uplink information that is of any size between 328 and 1000 and that is sent by the terminal device.

In some embodiments of this application, the terminal device is at a coverage enhancement level 2 or a coverage enhancement level 3, or in the coverage enhancement mode B; and the second TBS set includes at least a TBS value 936 and a TBS value 328; or the second TBS set includes at least a TBS value 936 and a TBS value 320.

For example, when the terminal device uses the coverage enhancement mode B, the second TBS set may include eight TBSs. A largest TBS value in the eight TBSs is 936, and a smallest TBS value is 328 or 320. Elements, namely, TBSs, included in the second TBS set are specifically determined with reference to an implementation scenario.

Further, in some embodiments of this application, the TBS values included in the second TBS set are 328, 408, 504, 584, 680, 776, 840, and 936;

the TBS values included in the second TBS set are 328, 408, 504, 584, 680, 776, 872, and 936;

the TBS values included in the second TBS set are 328, 392, 456, 504, 600, 712, 808, and 936; or the TBS values included in the second TBS set are 328, 408, 456, 504, 600, 712, 808, and 936.

For example, six values that are between 328 and 936 and that are approximately equi-spaced are selected. The second TBS set may include the values 328 and 936 at two ends and the six values. The second TBS set may include the eight TBS values. The eight determined largest TBS values are approximately equi-spaced, so that a quantity of padding bits can be reduced, with approximately equal probabilities, for uplink information that is of any size between 328 and 936 and that is sent by the terminal device.

In some embodiments of this application, the third TBS set includes a fourth TBS, where the fourth TBS is the first TBS, or the fourth TBS is a TBS closest to the first TBS.

The closest TBS is in a column that is in a preset TBS table and that corresponds to a quantity of PRBs, and is closest to the first TBS value. The preset TBS table shows a relationship among a TBS index, the quantity of PRBs, and a TBS value in a standard.

In some embodiments of this application, the third TBS set further includes M-1 TBSs, where M is a positive integer; and the M-1 TBSs start from the fourth TBS, and are determined, in natural descending order of TBS indexes, in a column that is in a preset TBS table and that corresponds to a quantity of PRBs;

the M-1 TBSs start from the fourth TBS, and are determined, based on equi-spaced TBS indexes, in a column that is in a preset TBS table and that corresponds to a quantity of PRBs; or the M-1 TBSs start from the fourth TBS, and are determined, in head-to-tail alternate order of TBS indexes, in a column that is in a preset TBS table and that corresponds to a quantity of PRBs.

In addition to the fourth TBS, the third TBS set may further include the M-1 TBSs. That the M-1 TBSs are determined in natural descending order of TBS indexes means that the M-1 TBSs are determined, in descending order of the TBS indexes, in the column that is in the preset TBS table and that corresponds to the quantity of PRBs. That the M-1 TBSs are determined based on the equi-spaced TBS indexes means that the M-1 TBSs are determined by using a same spacing. That the M-1 TBSs are determined in head-to-tail alternate order of the TBS indexes means that largest TBSs and smallest TBSs in the third TBS set are adjacent, being head-to-tail alternate means that the largest TBSs and the smallest TBSs in the third TBS set are connected head-to-tail, and the M-1 TBSs may be determined based on this. In subsequent embodiments, a manner of determining the M-1 TBSs is described with reference to corresponding tables.

303: The terminal device selects a TBS from the third TBS set, and sends uplink information based on the selected TBS.

The following uses an example to describe this embodiment of this application, and describes in detail determining a set of largest TBS values broadcast by a system message and determining, by the terminal device, a maximum of four selectable values less than or equal to the broadcast largest TBS value.

The terminal device supports only QPSK in a coverage level mode B, and an uplink grant can always carry a largest TBS broadcast by using the system message. For example, the largest TBS is 936. Therefore, a selectable TBS value, for example, data underlined in Table 1 below, for Msg3 when Msg3 carries data is determined.

The data underlined in the table is sorted. Six values that are between 328 and 936 and that are approximately equi-spaced are selected, to obtain {328, 408, 504, 584, 680, 776, 808, 936} or {328, 408, 504, 584, 680, 776, 872, 936}. Because gradients between two adjacent values in {776, 808, 936} or {776, 872, 936} differ relatively greatly, the penultimate value may be replaced with 840 in the table, to obtain {328, 408, 504, 584, 680, 776, 840, 936}.

A specific embodiment includes the following two types:

Type 1: That a modulation order 2, namely, QPSK, in the mode B is specified in the standard. In this case, a set of largest TBS values notified by using system information is {328, 408, 504, 584, 680, 776, 808, 936}, {328, 408, 504, 584, 680, 776, 872, 936}, or {328, 408, 504, 584, 680, 776, 840, 936}.

Type 2: That a modulation order is 2, namely, QPSK, in the mode B is not specified in the standard. The network device and the terminal device determine a TBS index based on Table 7.1.7.2.1-1 in the standard TS36.213, a quantity of allocated physical resource blocks (PRBs), and a TBS value, and then determine a modulation order based on the TBS index and Table 8.6.1-1 in the standard TS36.213. In this case, a set of largest TBS values notified by using system information is {328, 408, 504, 584, 680, 776, 808, 936} or {328, 408, 504, 584, 680, 776, 872, 936}.

The terminal device supports QPSK and 16 QAM in a coverage level mode A, and an uplink grant can always carry a largest TBS broadcast by using a system message. For example, the largest TBS is 1000. Therefore, a selectable TBS value, for example, data underlined in Table 2 below, for Msg3 when Msg3 carries data is determined.

TABLE 2

| Modulation order | TBS index | N_PRB | | | | | |
|---|---|---|---|---|---|---|---|
| | | 1 | 2 | 3 | 4 | 5 | 6 |
| QPSK | 0 | 16 | 32 | 56 | 88 | 120 | 152 |
| QPSK | 1 | 24 | 56 | 88 | 144 | 176 | 208 |
| QPSK | 2 | 32 | 72 | 144 | 176 | 208 | 256 |
| QPSK | 3 | 40 | 104 | 176 | 208 | 256 | 328 |
| QPSK | 4 | 56 | 120 | 208 | 256 | 328 | 408 |
| QPSK | 5 | 72 | 144 | 224 | 328 | 424 | 504 |
| QPSK | 6 | 328 | 176 | 256 | 392 | 504 | 600 |
| QPSK | 7 | 104 | 224 | 328 | 472 | 584 | 712 |
| QPSK | 8 | 120 | 256 | 392 | 536 | 680 | 808 |
| QPSK | 9 | 136 | 296 | 456 | 616 | 776 | 936 |
| QPSK/16QAM | 10 | 144 | 328 | 504 | 680 | 872 | 1032 |

TABLE 1

| Modulation order | TBS index | N_PRB | | | | | |
|---|---|---|---|---|---|---|---|
| (Modulation order) | | 1 | 2 | 3 | 4 | 5 | 6 |
| QPSK | 0 | 16 | 32 | 56 | 88 | 120 | 152 |
| QPSK | 1 | 24 | 56 | 88 | 144 | 176 | 208 |
| QPSK | 2 | 32 | 72 | 144 | 176 | 208 | 256 |
| QPSK | 3 | 40 | 104 | 176 | 208 | 256 | 328 |
| QPSK | 4 | 56 | 120 | 208 | 256 | 328 | 408 |
| QPSK | 5 | 72 | 144 | 224 | 328 | 424 | 504 |
| QPSK | 6 | 328 | 176 | 256 | 392 | 504 | 600 |
| QPSK | 7 | 104 | 224 | 328 | 472 | 584 | 712 |
| QPSK | 8 | 120 | 256 | 392 | 536 | 680 | 808 |
| QPSK | 9 | 136 | 296 | 456 | 616 | 776 | 936 |
| QPSK/16QAM | 10 | 144 | 328 | 504 | 680 | 872 | 1032 |
| 16QAM | 11 | 176 | 376 | 584 | 776 | 1000 | 1192 |
| 16QAM | 12 | 208 | 440 | 680 | 904 | 1128 | 1352 |
| 16QAM | 13 | 224 | 488 | 744 | 1000 | 1256 | 1544 |
| 16QAM | 14 | 256 | 552 | 840 | 1128 | 1416 | 1736 |

TABLE 2-continued

| Modulation order | TBS index | N_PRB | | | | | |
|---|---|---|---|---|---|---|---|
| | | 1 | 2 | 3 | 4 | 5 | 6 |
| 16QAM | 11 | 176 | <u>376</u> | <u>584</u> | <u>776</u> | 1000 | 1192 |
| 16QAM | 12 | 208 | <u>440</u> | <u>680</u> | <u>904</u> | 1128 | 1352 |
| 16QAM | 13 | 224 | <u>488</u> | <u>744</u> | <u>1000</u> | 1256 | 1544 |
| 16QAM | 14 | 256 | <u>552</u> | <u>840</u> | 1128 | 1416 | 1736 |

The data underlined in the table is sorted. Six values that are between 328 and 1000 and that are approximately equi-spaced are selected, to obtain {328, 424, 536, 616, 712, 808, 904, 1000}.

A specific implementation is as follows: The network device and the terminal device determine a TBS index based on Table 7.1.7.2.1-1 in the standard TS36.213, a quantity of allocated physical resource blocks (PRBs), and a TBS value. Optionally, the quantity of PRBs is configured by the network device in an uplink grant of a MAC RAR. After the TBS index is determined, a modulation order is determined based on the TBS index and Table 8.6.1-1 in the standard TS36.213, In this case, a set of largest TBS values notified by using system information is {328, 424, 536, 616, 712, 808, 904, 1000}.

It can be learned from the foregoing example description that, the eight largest TBS values that may be determined in this embodiment of this application are approximately equi-spaced, and a quantity of padding (padding) bits is reduced.

The following describes an application scenario in which the terminal device selects the TBS from the third TBS set and that is described in this embodiment of this application. In other words, a maximum of four values less than or equal to the largest TBS may be selected to constitute the third TBS set. In addition to the fourth TBS, the third TBS set further includes the M-1 TBSs.

The M-1 TBSs start from the fourth TBS, and are determined, in natural descending order of the TBS indexes, in the column that is in the preset TBS table and that corresponds to the quantity of PRBs;

the M-1 TBSs start from the fourth TBS, and are determined based on the equi-spaced TBS indexes, in the column that is in the preset TBS table and that corresponds to the quantity of PRBs; or the M-1 TBSs start from the fourth TBS, and are determined, in head-to-tail alternate order of the TBS indexes, in the column that is in the preset TBS table and that corresponds to the quantity of PRBs.

In addition to the fourth TBS, the third TBS set may further include the M-1 TBSs. That the M-1 TBSs are determined in natural descending order of TBS indexes means that the M-1 TBSs are determined, in descending order of the TBS indexes in the TBS table. That the M-1 TBSs are determined based on the equi-spaced TES indexes means that the M-1 TBSs are determined by using a same spacing. That the M-1 TBSs are determined in head-to-tail alternate order of the TBS indexes means that the largest TBSs and the smallest TBSs in the third. TBS set are adjacent, being head-to-tail alternate means that the largest TBSs and the smallest TBSs in the third TBS set are connected head-to-tail, and the M-1 TBSs may be determined based on this.

Specific Implementation 1

The terminal device searches the following Table 4 based on a largest TBS configured on a network and a quantity N of physical resource blocks, and sequentially selects a maximum of K TBS values (Min_TBS≤TBS≤Max_TBS, where the maximum of K TBS values include a largest TBS notified on a network, and there are a total of K values) in a column that corresponds to the quantity N of physical resource blocks and that is in the table. The sequential selection means that selection is performed in natural descending order of the TBS indexes. Max_TBS is a largest TBS value configured on the network. Min_TBS=328, or Min_TBS=296. K and N are positive integers greater than or equal to 1. N is a predetermined value or a value configured on the network. For example, N is equal to 4.

For example, for the largest TBS configured on the network,

Max_TBS=1000, the quantity N of physical resources blocks is 6, and K is 4. In this case, K values corresponding to Max_TBS are {1000, 936, 808, 712}. For example, for the largest TBS configured on the network, Max_TBS=456, the quantity N of physical resources blocks is 3, and K is 4. In this case, three values corresponding to Max_TBS are {456, 392, 328}. In this case, there are a total of three TBS values that are less than or equal to Max_TBS=456 and that correspond to the largest TBS.

The terminal device determines, according to the foregoing method, the K TBS values corresponding to Max_TBS notified on the network, selects, from the K TBS values, a TBS value (greater than or equal to a smallest value of a size of a to-be-sent transport block) that best matches the size of the to-be-sent transport block, and sends a PUSCH.

A network side determines, by using a same method, the K TBS values corresponding to Max_TBS. The network side receives the PUSCH, The network side detects the received PUSCH by using the K TBS values.

TABLE 4

| $I_{TBS}$ | $N_{PRB}$ | | | | | | | | | |
|---|---|---|---|---|---|---|---|---|---|---|
| | 1 | 2 | 3 | 4 | 5 | 6 | 7 | 8 | 9 | 10 |
| 0 | 16 | 32 | 56 | 88 | 120 | 152 | 176 | 208 | 224 | 256 |
| 1 | 24 | 56 | 88 | 144 | 176 | 208 | 224 | 256 | 328 | 344 |
| 2 | 32 | 72 | 144 | 176 | 208 | 256 | 296 | 328 | 376 | 424 |
| 3 | 40 | 104 | 176 | 208 | 256 | 328 | 392 | 440 | 504 | 568 |
| 4 | 56 | 120 | 208 | 256 | 328 | 408 | 488 | 552 | 632 | 696 |
| 5 | 72 | 144 | 224 | 328 | 424 | 504 | 600 | 680 | 776 | 872 |
| 6 | 328 | 176 | 256 | 392 | 504 | 600 | 712 | 808 | 936 | 1032 |
| 7 | 104 | 224 | 328 | 472 | 584 | 712 | 840 | 968 | 1096 | 1224 |
| 8 | 120 | 256 | 392 | 536 | 680 | 808 | 968 | 1096 | 1256 | 1384 |
| 9 | 136 | 296 | 456 | 616 | 776 | 936 | 1096 | 1256 | 1416 | 1544 |
| 10 | 144 | 328 | 504 | 680 | 872 | 1032 | 1224 | 1384 | 1544 | 1736 |
| 11 | 176 | 376 | 584 | 776 | 1000 | 1192 | 1384 | 1608 | 1800 | 2024 |

TABLE 4-continued

| | $N_{PRB}$ | | | | | | | | | |
|---|---|---|---|---|---|---|---|---|---|---|
| $I_{TBS}$ | 1 | 2 | 3 | 4 | 5 | 6 | 7 | 8 | 9 | 10 |
| 12 | 208 | 440 | 680 | 904 | 1128 | 1352 | 1608 | 1800 | 2024 | 2280 |
| 13 | 224 | 488 | 744 | 1000 | 1256 | 1544 | 1800 | 2024 | 2280 | 2536 |
| 14 | 256 | 552 | 840 | 1128 | 1416 | 1736 | 1992 | 2280 | 2600 | 2856 |

Specific Implementation 2

The terminal device searches the following Table 5 based on a largest TBS configured on a network and a quantity N of physical resource blocks, and selects a maximum of K TBS values (Min_TBS≤TBS≤Max_TBS, where the maximum of K TBS values include the largest TBS notified on the network, and there are a total of N values) by using the equal spacing (the spacing is Δ) in a column that corresponds to the quantity N of physical resource blocks and that is in the table. Max_TBS is a largest TBS value configured on the network. Min_TBS=328, or Min=296. K and N are positive integers greater than or equal to 1. N is a predetermined value or a value configured on the network. For example, N is equal to 4.

If Max_TBS configured on the network is a TBS in the corresponding column, a maximum of K equi-spaced values are selected from Max_TBS.

For example, for the largest TBS configured on the network, Max_TBS=456, the quantity N of physical resources blocks is 3, K is 4, and the spacing is Δ=2. In this case, two values corresponding to Max_TBS are {456, 328}. In this case, there are a total of two TBS values that correspond to the largest TBS and that are less than or equal to Max_TBS=456.

If Max_TBS configured on the network is not a TBS in the corresponding column, a maximum of K-1 equi-spaced values are selected from the first or second TBS value less than Max_TBS For example, for the largest TBS configured on the network, Max_TBS=1000, the quantity N of physical resources blocks is 6, and K is 4. In this case, K values corresponding to Max_TBS are {1000, 936, 712, 504} or {1000, 808, 600, 408}.

The terminal device determines, according to the foregoing method, the K TBS values corresponding to Max_TBS notified on the network, selects, from the K TBS values, a TBS value (greater than or equal to a smallest value of a size of a to-be-sent transport block) that best matches the size of the to-be-sent transport block, and sends a PUSCH. A network side determines, by using a same method, the K TBS values corresponding to Max_TBS. The network side receives the PUSCH. The network side detects the received PUSCH by using the K TBS values.

TABLE 5

| | $N_{PRB}$ | | | | | | | | | |
|---|---|---|---|---|---|---|---|---|---|---|
| $I_{TBS}$ | 1 | 2 | 3 | 4 | 5 | 6 | 7 | 8 | 9 | 10 |
| 0 | 16 | 32 | 56 | 88 | 120 | 152 | 176 | 208 | 224 | 256 |
| 1 | 24 | 56 | 88 | 144 | 176 | 208 | 224 | 256 | 328 | 344 |
| 2 | 32 | 72 | 144 | 176 | 208 | 256 | 296 | 328 | 376 | 424 |
| 3 | 40 | 104 | 176 | 208 | 256 | 328 | 392 | 440 | 504 | 568 |
| 4 | 56 | 120 | 208 | 256 | 328 | 408 | 488 | 552 | 632 | 696 |
| 5 | 72 | 144 | 224 | 328 | 424 | 504 | 600 | 680 | 776 | 872 |
| 6 | 328 | 176 | 256 | 392 | 504 | 600 | 712 | 808 | 936 | 1032 |
| 7 | 104 | 224 | 328 | 472 | 584 | 712 | 840 | 968 | 1096 | 1224 |
| 8 | 120 | 256 | 392 | 536 | 680 | 808 | 968 | 1096 | 1256 | 1384 |
| 9 | 136 | 296 | 456 | 616 | 776 | 936 | 1096 | 1256 | 1416 | 1544 |
| 10 | 144 | 328 | 504 | 680 | 872 | 1032 | 1224 | 1384 | 1544 | 1736 |
| 11 | 176 | 376 | 584 | 776 | 1000 | 1192 | 1384 | 1608 | 1800 | 2024 |
| 12 | 208 | 440 | 680 | 904 | 1128 | 1352 | 1608 | 1800 | 2024 | 2280 |
| 13 | 224 | 488 | 744 | 1000 | 1256 | 1544 | 1800 | 2024 | 2280 | 2536 |
| 14 | 256 | 552 | 840 | 1128 | 1416 | 1736 | 1992 | 2280 | 2600 | 2856 |

Specific Implementation 3

The terminal device searches the following Table 6 based on a largest TBS configured on a network and a quantity N of physical resource blocks, and selects a maximum of K TBS values (Min_TBS≤TBS≤Max_TBS, where the maximum of K TBS values include the largest TBS notified on the network, and there are a total of N values) in head-to-tail alternate order in a column that corresponds to the quantity N of physical resource blocks and that is in the table. Max_TBS is a largest TBS value configured on the network. Min_TBS=328, or Min_TBS=296. K and N are positive integers greater than or equal to 1. N is a predetermined value or a value configured on the network. For example, N is equal to 4.

If Max_TBS configured on the network is a MS in the corresponding column, a maximum of K values are selected from Max_TBS alternately.

For example, for the largest TBS configured on the network, Max_TBS=456, the quantity N of physical resources blocks is 3, K is 4, and the spacing is Δ=2. In this case, three values corresponding to Max_TBS are {456, 328, 392}. In this case, there are a total of three TBS values that correspond to the largest TBS and that are less than or equal to Max_TBS=456.

If Max_TBS configured on the network is not a TBS in the corresponding column, a maximum of K-1 values are alternately selected from the first or second TBS value less than Max_TBS.

For example, for the largest TBS configured on the network, Max_TBS=1000, the quantity N of physical resources blocks is 6, and K is 4. In this case, K values corresponding to Max_TBS are {1000, 936, 328, 712} or {1000, 808, 328, 600}.

The terminal device determines, according to the foregoing method, the K TBS values corresponding to Max_TBS notified on the network, selects, from the K TBS values, a TBS value (greater than or equal to a smallest value of a size of a to-be-sent transport block) that best matches the size of the to-be-sent transport block, and sends a PUSCH.

A network side determines, by using a same method, the K TBS values corresponding to Max_TBS. The network side receives the PUSCH. The network side detects the received PUSCH by using the K TBS values.

TABLE 6

| $I_{TBS}$ | $N_{PRB}$ | | | | | | | | | |
|---|---|---|---|---|---|---|---|---|---|---|
| | 1 | 2 | 3 | 4 | 5 | 6 | 7 | 8 | 9 | 10 |
| 0 | 16 | 32 | 56 | 88 | 120 | 152 | 176 | 208 | 224 | 256 |
| 1 | 24 | 56 | 88 | 144 | 176 | 208 | 224 | 256 | 328 | 344 |
| 2 | 32 | 72 | 144 | 176 | 208 | 256 | 296 | 328 | 376 | 424 |
| 3 | 40 | 104 | 176 | 208 | 256 | 328 | 392 | 440 | 504 | 568 |
| 4 | 56 | 120 | 208 | 256 | 328 | 408 | 488 | 552 | 632 | 696 |
| 5 | 72 | 144 | 224 | 328 | 424 | 504 | 600 | 680 | 776 | 872 |
| 6 | 328 | 176 | 256 | 392 | 504 | 600 | 712 | 808 | 936 | 1032 |
| 7 | 104 | 224 | 328 | 472 | 584 | 712 | 840 | 968 | 1096 | 1224 |
| 8 | 120 | 256 | 392 | 536 | 680 | 808 | 968 | 1096 | 1256 | 1384 |
| 9 | 136 | 296 | 456 | 616 | 776 | 936 | 1096 | 1256 | 1416 | 1544 |
| 10 | 144 | 328 | 504 | 680 | 872 | 1032 | 1224 | 1384 | 1544 | 1736 |
| 11 | 176 | 376 | 584 | 776 | 1000 | 1192 | 1384 | 1608 | 1800 | 2024 |
| 12 | 208 | 440 | 680 | 904 | 1128 | 1352 | 1608 | 1800 | 2024 | 2280 |
| 13 | 224 | 488 | 744 | 1000 | 1256 | 1544 | 1800 | 2024 | 2280 | 2536 |
| 14 | 256 | 552 | 840 | 1128 | 1416 | 1736 | 1992 | 2280 | 2600 | 2856 |

For Implementation 1 to Implementation 3 above, a method for determining a modulation order by the terminal device and the network device is: determining a corresponding TBS index based on a TBS table, namely, Table 7.1.7.2.1-1 in TS36.213, by using a determined TBS and a quantity of PRBs configured on the network, and then determining the corresponding modulation order based on Table 8.6.1-1 in TS36.213 by using the determined TBS index.

Specific Implementation4

K values that correspond to each Max_TBS configured on a network and that are less than or equal to Max_TBS are preset.

As shown in Table 7 below, for example, a set of Max_TBS values configured on the network is {328, 424, 536, 616, 712, 808, 904, 1000}.

A maximum of K values corresponding to each Max_TBS value and less than or equal to the Max_TBS value are a maximum of K consecutive values including Max_TBS. K is an integer less than or equal to 4.

TABLE 7

| Max_TBS value | Third TBS set including a maximum of K values corresponding to the Max_TBS value and less than or equal to the Max_TBS value |
|---|---|
| 1000 | {712, 808, 904, 1000} |
| 904 | {616, 712, 808, 904} |
| 808 | {536, 616, 712, 808} |

TABLE 7-continued

| Max_TBS value | Third TBS set including a maximum of K values corresponding to the Max_TBS value and less than or equal to the Max_TBS value |
|---|---|
| 712 | {424, 536, 616, 712} |
| 616 | {328, 424, 536, 616} |
| 536 | {328, 424, 536} |
| 424 | {328, 424} |
| 328 | {328} |

Because Max_TBS=1000/904/808 is relatively large, a maximum of K corresponding values less than or equal to Max_TBS are Max_TBS selected at an equal spacing, as shown in Table 8 below.

TABLE 8

| Max_TBS value | Third TBS set including a maximum of K values corresponding to the Max_TBS value and less than or equal to the Max_TBS value |
|---|---|
| 1000 | {424, 616, 808, 1000} |
| 904 | {328, 536, 712, 904} |
| 808 | {328, 424, 616, 808} |
| 712 | {424, 536, 616, 712} |
| 616 | {328, 424, 536, 616} |
| 536 | {328, 424, 536} |
| 424 | {328, 424} |
| 328 | {328} |

If a value of K is configured on the network, and a value of N is less than 4, for example, N is equal to 2, values corresponding to each Max_TBS and less than or equal to the Max_TBS value are the first two values in a set of four values in the foregoing table.

For Implementation 4, a method for determining a modulation order corresponding to a TBS value in the third TBS set includes:

determining the modulation order based on the Max_TBS and a quantity of physical resource blocks; or determining the modulation order based on a TBS value that is in a column corresponding to a current quantity of physical resource blocks and that is closest to the TBS value in the third TBS set, where being closest includes two cases: being greater than a smallest value in the TBS values in the set and being less than a largest value in the TBS values in the set.

In this embodiment of this application, eight largest TBS values Max_TBS configured on the network.

The methods (Implementation 1 to Implementation 4) for determining a maximum of four TBS values less than or equal to Max_TBS and corresponding to Max_TBS: The eight largest TBS values Max_TBS configured on the network: Gradients between adjacent values are approximately equal, and a quantity of padding bits is reduced. The maximum of four TBS values less than or equal to MaxTBS: Table lookup method: A specific value does not need to be standardized, and the terminal device and the network device determine the specific value based on a specific quantity of RBs and a notified MaxTBS. Determining based on the eight MaxTBS values: determining, based on the notified MaxTBSs and a value of N, less than or equal to N corresponding values less than the MaxTBSs (for some MaxTBSs, a quantity of values less than the MaxTBSs is less than K). EDT is enabled on the network per CE level. Signaling overheads are reduced, and EDT is enabled depending on whether there is signaling for notifying the MaxTBS.

It can be learned from the example descriptions in the foregoing embodiment that, the network device in this embodiment of this application may determine to configure the first TBS, so that the terminal device may determine the third TBS set based on the first TBS. The terminal device selects the TBS in the third TBS set to send the uplink information. Therefore, the terminal device has flexibility of selecting the TBS in the third TBS set. The terminal device sends the uplink information by using the TBS selected by the terminal device. The network device may determine, by using the third TBS set, the TBS selected by the terminal device, to receive the uplink information by using the TBS selected by the terminal device. The terminal device in this embodiment of this application may select the TBS in the third TBS set, where the TBS is used to send the uplink information. Therefore, the TBS for sending the uplink information is flexibly selected, so that resource utilization is improved, and a waste of resources is avoided as much as possible.

Figure 4:
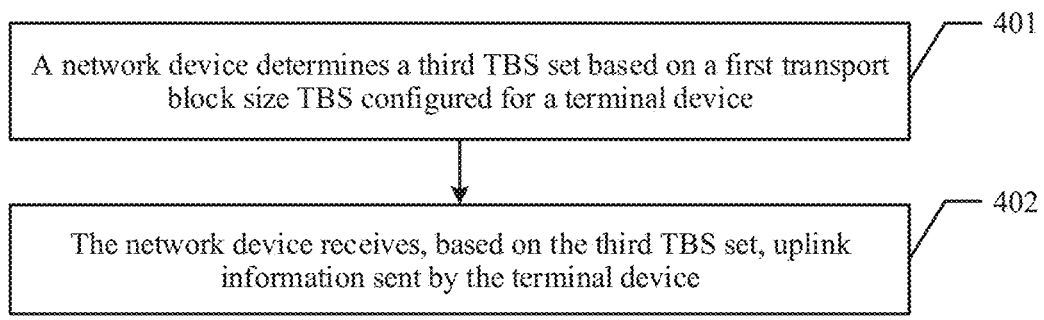
FIG. 4 is a schematic block flowchart of an information receiving method according to an embodiment of this application.

The foregoing embodiment describes, from a perspective of the terminal device, the information sending method provided in the embodiments of this application. The following describes, from a perspective of the network device, the information receiving method provided in the embodiments of this application. Referring to FIG. 4, an embodiment of this application provides an information receiving method, including the following steps.

401: The network device determines a third transport block size TBS set based on a first TBS configured for the terminal device, where the first TBS is a TBS selected by the network device from a second TBS set, the second TBS set includes N TBSs, and N is a positive integer greater than 1.

For example, a value of N may be equal to 8. The network device selects a TBS from the second TBS set as the first TBS. For example, when the terminal device uses a coverage enhancement mode A, a largest TBS in the second TBS set may be 1000, and a smallest TBS in the second TBS set may be 328 or 320. Six values that are between 328 and 1000 and that are approximately equi-spaced are selected, so that the second TBS set is {328, 424, 536, 616, 73.2, 808, 904, 1000}.

For another example, when the terminal device uses a coverage enhancement mode B, a largest TBS in the second TBS set may be 936, and a smallest TBS in the second TBS set may be 328 or 320. Then, six values that are between 328 and 936 and that are approximately equi-spaced are selected, so that the second TBS set is {328, 408, 504, 584, 680, 776, 808, 936}. The first TBS may be a TBS value in the second TBS set.

402: The network device receives, based on the third TBS set, uplink information sent by the terminal device.

In some embodiments of this application, the terminal device is at a coverage enhancement level 0 or a coverage enhancement level 1, or in a coverage enhancement mode A; and the second TBS set includes at least a TBS value 936 and a TBS value 328; or the second TBS set includes at least a TBS value 936 and a TBS value 320.

For example, the second TBS set may include eight TBSs. A largest TBS value in the eight TBSs is 1000, and a smallest TBS value is 328 or 320. Elements, namely, TBSs, included in the second TBS set are specifically determined with reference to an implementation scenario.

In some embodiments of this application, the TBS values included in the second TBS set are 328, 424, 536, 616, 712, 808, 904, and 1000; or the TBS values included in the second TBS set are 328, 440, 504, 600, 712, 808, 936, and 1000.

For example, six values that are between 328 and 1000 and that are approximately equi-spaced are selected. The second TBS set may include the values 328 and 1000 at two ends and the six values. The second TBS set may include the eight TBS values. The eight determined largest TBS values are approximately equi-spaced, so that a quantity of padding bits can be reduced, with approximately equal probabilities, for uplink information that is of any size between 328 and 1000 and that is sent by the terminal device.

In some embodiments of this application, the terminal device is at a coverage enhancement level 2 or a coverage enhancement level 3, or in a coverage enhancement mode B; and the second TBS set includes at least a TBS value 936 and a TBS value 328; or the second TBS set includes at least a TBS value 936 and a TBS value 320.

For example, when the terminal device uses the coverage enhancement mode B, the second TBS set may include eight TBSs. A largest TBS value in the eight TBSs is 936, and a smallest TBS value is 328 or 320. Elements, namely, TBSs, included in the second TBS set are specifically determined with reference to an implementation scenario.

In some embodiments of this application, the TBS values included in the second TBS set are 328, 408, 504, 584, 680, 776, 840, and 936;

the TBS values included in the second TBS set are 328, 408, 504, 584, 680, 776, 872, and 936;

the TBS values included in the second TBS set are 328, 392, 456, 504, 600, 712, 808, and 936; or the TBS values included in the second TBS set are 328, 408, 456, 504, 600, 712, 808, and 936.

For example, six values that are between 328 and 936 and that are approximately equi-spaced are selected. The second TBS set may include the values 328 and 936 at two ends and the six values. The second TBS set may include the eight TBS values. The eight determined largest TBS values are approximately equi-spaced, so that a quantity of padding bits can be reduced, with approximately equal probabilities, for uplink information that is of any size between 328 and 936 and that is sent by the terminal device.

In some embodiments of this application, the third TBS set includes a fourth TBS, where the fourth TBS is the first TBS, or the fourth TBS is a TBS closest to the first TBS.

In some embodiments of this application, the third TBS set further includes M-1 TBSs, where M is a positive integer; and the M-1 TBSs start from the fourth TBS, and are determined, in natural descending order of TBS indexes, in a column that is in a preset TBS table and that corresponds to a quantity of PRBs;

the M-1 TBSs start from the fourth TBS, and are determined, based on equi-spaced TBS indexes, in a column that is in a preset TBS table and that corresponds to a quantity of PRBs; or the M-1 TBSs start from the fourth TBS, and are determined, in head-to-tail alternate order of TBS indexes, in a column that is in a preset TBS table and that corresponds to a quantity of PRBs.

In addition to the fourth TBS, the third TBS set may further include the M-1 TBSs. That the M-1 TBSs are determined in natural descending order of TBS indexes means that the M-1 TBSs are determined, in descending order of the TBS indexes, in the column that is in the preset TBS table and that corresponds to the quantity of PRBs. That the M-1 TBSs are determined based on the equi-spaced TBS indexes means that the M-1 TBSs are determined by using a same spacing. That the M-1 TBSs are determined in head-to-tail alternate order of the TBS indexes means that largest TBSs and smallest TBSs in the third TBS set are adjacent, being head-to-tail alternate means that the largest TBSs and the smallest TBSs in the third TBS set are connected head-to-tail, and the M-1 TBSs may be determined based on this. In subsequent embodiments, a manner of determining the M-1 TBSs is described with reference to corresponding tables.

It can be learned from the example descriptions in the foregoing embodiment that, the network device in this embodiment of this application may determine to configure the first TBS, so that the terminal device may determine the third TBS set based on the first TBS. The terminal device selects the TBS in the third TBS set to send the uplink information. Therefore, the terminal device has flexibility of selecting the TBS in the third TBS set. The terminal device sends the uplink information by using the TBS selected by the terminal device. The network device may determine, by using the third TBS set, the TBS selected by the terminal device, to receive the uplink information by using the TBS selected by the terminal device. The terminal device in this embodiment of this application may select the TBS in the third TBS set, where the TBS is used to send the uplink information. Therefore, the TBS for sending the uplink information is flexibly selected, so that resource utilization is improved, and a waste of resources is avoided as much as possible.

It should be noted that, for brief description, the foregoing method embodiments are expressed as a series of actions. However, a person skilled in the art should appreciate that this application is not limited to the described order of the actions, because according to this application, some steps may be performed in other orders or simultaneously. It should be further appreciated by a person skilled in the art that the involved actions and modules are not necessarily required by this application.

To better implement the foregoing solutions in the embodiments of this application, the following further provides related apparatuses configured to implement the foregoing solutions.

Figure 5:
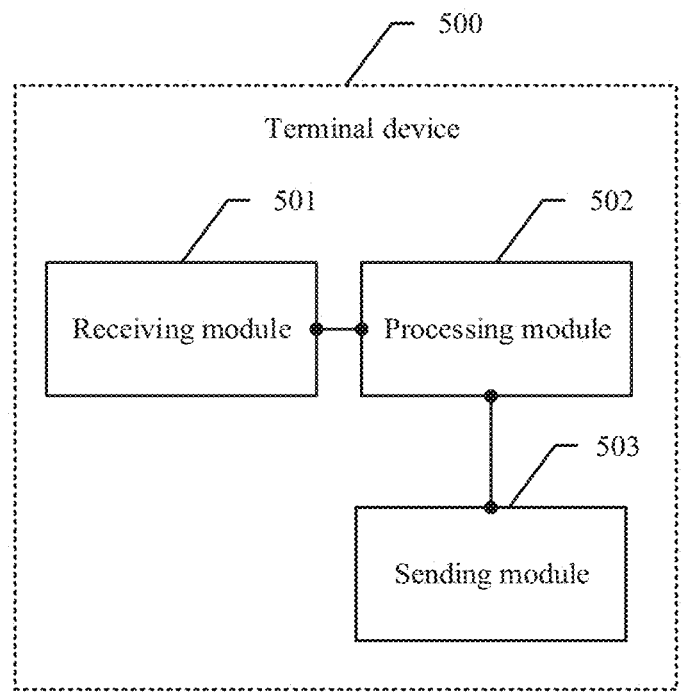
FIG. 5 is a schematic diagram of a composition structure of a terminal device according to an embodiment of this application.

Referring to FIG. 5, a terminal device 500 provided in an embodiment of this application may include:

a receiving module 501, configured to receive a first transport block size TBS configured by a network device, where the first TBS is a TBS selected by the network device from a second TBS set, the second TBS set includes N TBSs, and N is a positive integer greater than 1;

a processing module 502, configured to determine a third TBS set based on the first TBS, where a largest TBS in the third TBS set is less than or equal to the first TBS; and a sending module 503, further configured to select a TBS from the third TBS set, and send uplink information based on the selected TBS.

In some embodiments of this application, the terminal device is at a coverage enhancement level 0 or a coverage enhancement level 1, or in a coverage enhancement mode A; and the second TBS set includes at least a TBS value 1000 and a TBS value 328; or the second TBS set includes at least a TBS value 1000 and a TBS value 320, In some embodiments of this application, the TBS values included in the second TBS set are 328, 424, 536, 616, 712, 808, 904, and 1000; or the TBS values included in the second TBS set are 328, 440, 504, 600, 712, 808, 936, and 1000.

In some embodiments of this application, the terminal device is at a coverage enhancement level 2 or a coverage enhancement level 3, or in a coverage enhancement mode B; and the second TBS set includes at least a TBS value 936 and a TBS value 328; or the second TBS set includes at least a TBS value 936 and a TBS value 320.

In some embodiments of this application, the TBS values included in the second TBS set are 328, 408, 504, 584, 680, 776, 840, and 936;

the TBS values included in the second TBS set are 328, 408, 504, 584, 680, 776, 872, and 936;

the TBS values included in the second TBS set are 328, 392, 456, 504, 600, 712, 808, and 936; or the TBS values included in the second TBS set are 328, 456, 504, 600, 712, 808, and 936.

In some embodiments of this application, the third TBS set includes a fourth TBS, where the fourth TBS is the first TBS, or the fourth TBS is a TBS closest to the first TBS.

In some embodiments of this application, the third TBS set further includes M-1 TBSs, where M is a positive integer; and the M-1 TBSs start from the fourth TBS, and are determined, in natural descending order of MS indexes, in a column that is in a preset TBS table and that corresponds to a quantity of PRBs;

the M-1 TBSs start from the fourth TBS, and are determined, based on equi-spaced TBS indexes, in a column that is in a preset TBS table and that corresponds to a quantity of PRBs; or the M-1 TBSs start from the fourth TBS, and are determined, in head-to-tail alternate order of TBS indexes, in a column that is in a preset TBS table and that corresponds to a quantity of PRBs.

It can be learned from the example descriptions in the foregoing embodiment that, the network device in this embodiment of this application may determine to configure the first TBS, so that the terminal device may determine the third TBS set based on the first TBS. The terminal device selects the TBS in the third TBS set to send the uplink information. Therefore, the terminal device has flexibility of selecting the TBS in the third TBS set. The terminal device sends the uplink information by using the TBS selected by the terminal device. The network device may determine, by using the third TBS set, the TBS selected by the terminal device, to receive the uplink information by using the TBS selected by the terminal device. The terminal device in this embodiment of this application may select the TBS in the third TBS set, where the TBS is used to send the uplink information. Therefore, the TBS for sending the uplink information is flexibly selected, so that resource utilization is improved, and a waste of resources is avoided as much as possible.

Figure 6:
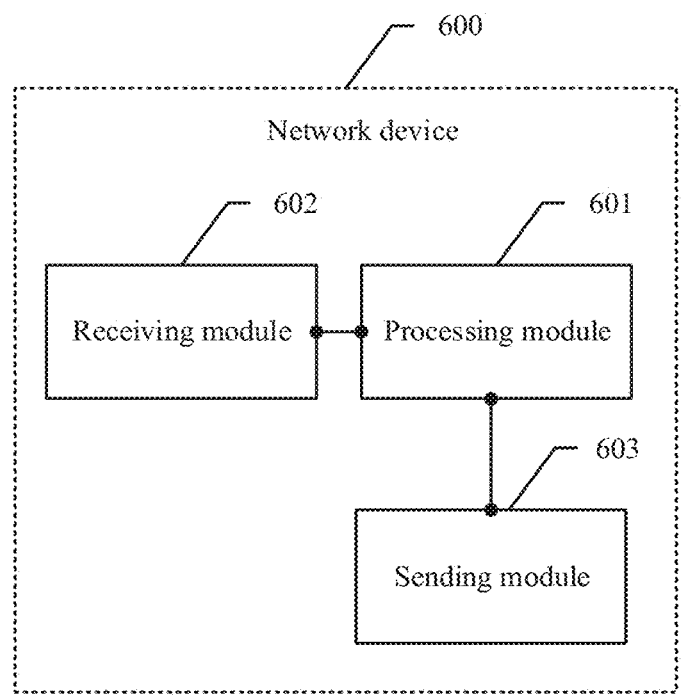
FIG. 6 is a schematic diagram of a composition structure of a network device according to an embodiment of this application.

As shown in FIG. 6, an embodiment of this application provides a network device 600, including:

a processing module 601, configured to determine a third transport block size TBS set based on a first TBS configured for a terminal device, where the first TBS is a TBS selected by the network device from a second TBS set, the second TBS set includes N TBSs, and N is a positive integer greater than 1; and a receiving module 602, configured to receive, based on the third TBS set, uplink information sent by the terminal device.

In some embodiments of this application, the terminal device is at a coverage enhancement level 0 or a coverage enhancement level 1, or in a coverage enhancement mode A; and the second TBS set includes at least a TBS value 936 and a TBS value 328: or the second TBS set includes at least a TBS value 936 and a TBS value 320.

In some embodiments of this application, the TBS values included in the second TBS set are 328, 424, 536, 616, 712, 808, 904, and 1000; or the TBS values included in the second TBS set are 328, 440, 504, 600, 712, 808, 936, and 1000.

In some embodiments of this application, the terminal device is at a coverage enhancement level 2 or a coverage enhancement level 3, or in a coverage enhancement mode B: and the second TBS set includes at least a TBS value 936 and a TBS value 328; of the second TBS set includes at least a TBS value 936 and a TBS value 320.

In some embodiments of this application, the TBS values included in the second TBS set are 328, 408, 504, 584, 680, 776, 840, and 936;

the TBS values included in the second TBS set are 328, 408, 504, 584, 680, 776, 872, and 936;

the TBS values included in the second TBS set are 328, 392, 456, 504, 600, 712, 808, and 936; or the TBS values included in the second TBS set are 328, 408, 456, 504, 600, 712, 808, and 936.

In some embodiments of this application, the third TBS set includes a fourth TBS, where the fourth TBS is the first TBS, or the fourth TBS is a TBS closest to the first TBS.

In some embodiments of this application, the third TBS set further includes M-1 TBSs, where M is a positive integer; and the M-1 TBSs start from the fourth TBS, and are determined, in natural descending order of MS indexes, in a column that is in a preset TBS table and that corresponds to a quantity of PRBs;

the M-1 TBSs start from the fourth TBS, and are determined, based on equi-spaced TBS indexes, in a column that is in a preset TBS table and that corresponds to a quantity of PRBs; or the M-1 TBSs start from the fourth TBS, and are determined, in head-to-tail alternate order of TBS indexes, in a column that is in a preset TBS table and that corresponds to a quantity of PRBs.

In some embodiments of this application, the network device 600 further includes a sending module 603, configured to send the first TBS to the terminal device.

It can be learned from the example descriptions in the foregoing embodiment that, the network device in this embodiment of this application may determine to configure the first TBS, so that the terminal device may determine the third. TBS set based on the first TBS. The terminal device selects the TBS in the third TBS set to send the uplink information. Therefore, the terminal device has flexibility of selecting the TBS in the third TBS set. The terminal device sends the uplink information by using the TBS selected by the terminal device. The network device may determine, by using the third TBS set, the TBS selected by the terminal device, to receive the uplink information by using the TBS selected by the terminal device. The terminal device in this embodiment of this application may select the TBS in the third TBS set, where the TBS is used to send the uplink information. Therefore, the TBS for sending the uplink information is flexibly selected, so that resource utilization is improved, and a waste of resources is avoided as much as possible.

It should be noted that, content such as information exchange between the modules/units of the apparatuses and the execution processes thereof is based on the same idea as the method embodiments of this application, and produces the same technical effects as the method embodiments of this application. For specific content, refer to the foregoing description in the method embodiments of this application. Details are not described herein again.

An embodiment of the present invention further provides a computer storage medium. The computer storage medium stores a program. When the program is executed, some or all steps recorded in the foregoing method embodiments are performed.

Figure 7:
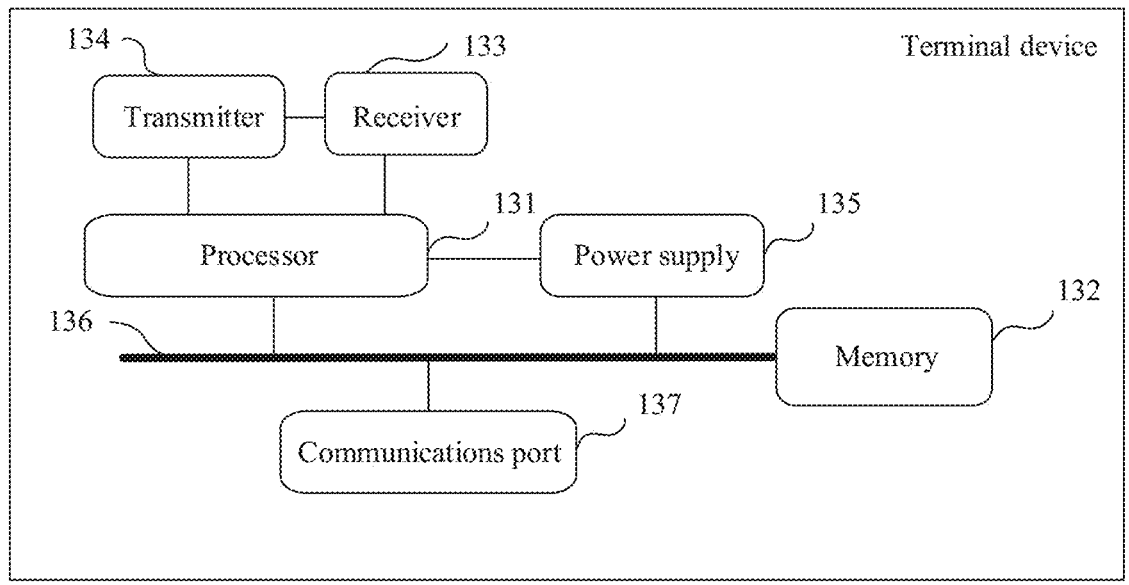
FIG. 7 is a schematic diagram of a composition structure of another terminal device according to an embodiment of this application.

FIG. 7 is a schematic structural diagram of another device according to an embodiment of this application. The device is a terminal device. The terminal device may include a processor 131 (for example, a CPU), a memory 132, a transmitter 134, and a receiver 133. The transmitter 134 and the receiver 133 are coupled to the processor 131. The processor 131 controls a sending action of the transmitter 134 and a receiving action of the receiver 133. The memory 132 may include a high-speed RAM memory, or may further include a nonvolatile memory NVM, for example, at least one magnetic disk memory. The memory 132 may store various instructions, to implement various processing functions and method steps in the embodiments of this application. Optionally, the terminal device in this embodiment of this application may further include one or more of a power supply 135, a communications bus 136, and a communications port 137. The receiver 133 and the transmitter 134 may be integrated into a transceiver of the terminal device, or may be a receive antenna and a transmit antenna that are independent of each other on the terminal device. The communications bus 136 is configured to implement communication connection between elements. The communications port 137 is configured to implement connection and communication between the terminal device and another peripheral.

In this embodiment of this application, the memory 132 is configured to store computer executable program code. The program code includes an instruction. When the processor 131 executes the instruction, the instruction enables the processor 131 to perform a processing action of the terminal device in the foregoing method embodiment, and enables the transmitter 134 to perform a sending action of the terminal device in the foregoing method embodiment.

In this embodiment of this application, the receiver 133 is configured to receive a first transport block size TBS configured by a network device, where the first TBS is a TBS selected by the network device from a second TBS set, the second TBS set includes N TBSs, and N is a positive integer greater than 1;

the processor 131 is configured to determine a third TBS set based on the first TBS, where a largest TBS in the third TBS set is less than or equal to the first TBS; and the transmitter 134 is further configured to select a TBS from the third TBS set, and send uplink information based on the selected TBS.

In some embodiments of this application, the terminal device is at a coverage enhancement level 0 or a coverage enhancement level 1, or in a coverage enhancement mode A; and the second TBS set includes at least a TBS value 1000 and a TBS value 328; or the second TBS set includes at least a TBS value 1000 and a TBS value 320.

In some embodiments of this application, the TBS values included in the second TBS set are 328, 424, 536, 616, 712, 808, 904, and 1000; or the TBS values included in the second TBS set are 328, 440, 504, 600, 712, 808, 936, and 1000.

In some embodiments of this application, the terminal device is at a coverage enhancement level 2 or a coverage enhancement level 3, or in a coverage enhancement mode B; and the second TBS set includes at least a TBS value 936 and a TBS value 328; or the second TBS set includes at least a TBS value 936 and a TBS value 320.

In some embodiments of this application, the TBS values included in the second TBS set are 328, 408, 504, 584, 680, 776, 840, and 936;

the TBS values included in the second TBS set are 328, 408, 504, 584, 680, 776, 872, and 936;

the TBS values included in the second TBS set are 328, 392, 456, 504, 600, 712, 808, and 936; or the TBS values included in the second TBS set are 328, 408, 456, 504, 600, 712, 808, and 936.

In some embodiments of this application, the third TBS set includes a fourth TBS, where the fourth TBS is the first TBS, or the fourth TBS is a TBS closest to the first TBS.

In some embodiments of this application, the third TBS set further includes M-1 TBSs, where M is a positive integer; and the M-1 TBSs start from the fourth TBS, and are determined, in natural descending order of TBS indexes, in a column that is in a preset TBS table and that corresponds to a quantity of PRBs;

the M-1 TBSs start from the fourth TBS, and are determined, based on equi-spaced TBS indexes, in a column that is in a preset TBS table and that corresponds to a quantity of PRBs; or the M-1 TBSs start from the fourth TBS, and are determined, in head-to-tail alternate order of TBS indexes, in a column that is in a preset TBS table and that corresponds to a quantity of PRBs.

It can be learned from the example descriptions in the foregoing embodiment that, the network device in this embodiment of this application may determine to configure the first TBS, so that the terminal device may determine the third TBS set based on the first TBS. The terminal device selects the TBS in the third TBS set to send the uplink information. Therefore, the terminal device has flexibility of selecting the TBS in the third TBS set. The terminal device sends the uplink information by using the TBS selected by the terminal device. The network device may determine, by using the third TBS set, the TBS selected by the terminal device, to receive the uplink information by using the TBS selected by the terminal device. The terminal device in this embodiment of this application may select the TBS in the third MS set, where the MS is used to send the uplink information. Therefore, the TBS for sending the uplink information is flexibly selected, so that resource utilization is improved, and a waste of resources is avoided as much as possible.

Figure 8:
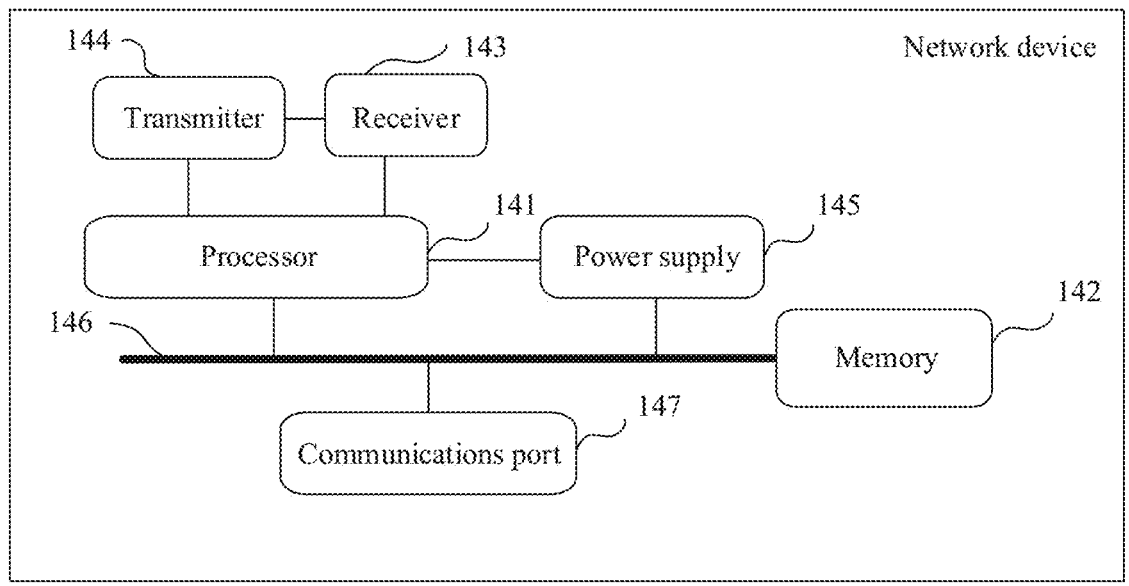
FIG. 8 is a schematic diagram of a composition structure of another network device according to an embodiment of this application.

FIG. 8 is a schematic structural diagram of another device according to an embodiment of this application. The device is a network device. The network device may include a processor (for example, a CPU) 141, a memory 142, a receiver 143, and a transmitter 144. The receiver 143 and the transmitter 144 are coupled to the processor 141. The processor 141 controls a receiving action of the receiver 143 and a sending action of the transmitter 144. The memory 142 may include a high-speed RAM memory, or may further include a nonvolatile memory NVM, for example, at least one magnetic disk memory. The memory 142 may store various instructions, to implement various processing functions and method steps in the embodiments of this application. Optionally, the network device in this embodiment of this application may further include one or more of a power supply 145, a communications bus 146, and a communications port 147. The receiver 143 and the transmitter 144 may be integrated into a transceiver of the network device, or may be a receive antenna and a transmit antenna that are independent of each other on the network device. The communications bus 146 is configured to implement communication connection between elements. The communications port 147 is configured to implement connection and communication between the network device and another peripheral.

In this embodiment of this application, the memory 142 is configured to store computer executable program code. The program code includes an instruction. When the processor 141 executes the instruction, the instruction enables the processor 141 to perform a processing action of the network device in the foregoing method embodiment, and enables the transmitter 144 to perform a sending action of the network device in the foregoing method embodiment.

In some embodiments of this application, the processor 141 is configured to determine a third transport block size TBS set based on a first TBS configured for a terminal device, where a largest TBS in the third TBS set is less than or equal to the first TBS, the first TBS is a TBS selected by the network device from a second TBS set, the second TBS set includes N TBSs. and N is a positive integer greater than 1; and the receiver 143 is configured to receive, based on the third TBS set, uplink information sent by the terminal device.

In some embodiments of this application, the terminal device is at a coverage enhancement level 0 or a coverage enhancement level 1, or in a coverage enhancement mode A; and the second TBS set includes at least a TBS value 936 and a TBS value 328; or the second TBS set includes at least a TBS value 936 and a TBS value 320.

In some embodiments of this application, the TBS values included in the second TBS set are 328, 424, 536, 616, 712, 808, 904, and 1000; or the TBS values included in the second TBS set are 328, 440, 504, 600, 712, 808, 936, and 1000.

In some embodiments of this application, the terminal device is at a coverage enhancement level 2 or a coverage enhancement level 3, or in a coverage enhancement mode B; and the second TBS set includes at least a TBS value 936 and a TBS value 328; or the second TBS set includes at least a TBS value 936 and a TBS value 320.

In some embodiments of this application, the TBS values included in the second TBS set are 328, 408, 504, 584, 680, 776, 840, and 936;

the TBS values included in the second TBS set are 328, 408, 504, 584, 680, 776, 872, and 936;

the TBS values included in the second TBS set are 328, 392, 456, 504, 600, 712, 808, and 936; or the TBS values included in the second TBS set are 328, 408, 456, 504, 600, 712, 808, and 936.

In some embodiments of this application, the third TBS set includes a fourth TBS, where the fourth TBS is the first TBS, or the fourth TBS is a TBS closest to the first TBS.

In some embodiments of this application, the third TBS set further includes M-1 TBSs, where M is a positive integer; and the M-1 TBSs start from the fourth TBS, and are determined, in natural descending order of TBS indexes, in a column that is in a preset TBS table and that corresponds to a quantity of PRBs;

the M-1 TBSs start from the fourth TBS, and are determined, based on equi-spaced TBS indexes, in a column that is in a preset TBS table and that corresponds to a quantity of PRBs, or the M-1 TBSs start from the fourth TBS, and are determined, in head-to-tail alternate order of TBS indexes, in a column that is in a preset TBS table and that corresponds to a quantity of PRBs.

It can be learned from the example descriptions in the foregoing embodiment that, the network device in this embodiment of this application may determine to configure the first TBS, so that the terminal device may determine the third TBS set based on the first TBS. The terminal device selects the TBS in the third TBS set to send the uplink information. Therefore, the terminal device has flexibility of selecting the TBS in the third TBS set. The terminal device sends the uplink information by using the TBS selected by the terminal device. The network device may determine, by using the third TBS set, the TBS selected by the terminal device, to receive the uplink information by using the TBS selected by the terminal device. The terminal device in this embodiment of this application may select the TBS in the third TBS set, where the TBS is used to send the uplink information. Therefore, the TBS for sending the uplink information is flexibly selected, so that resource utilization is improved, and a waste of resources is avoided as much as possible.

In another possible design, when the apparatus is a chip in a terminal. The chip includes a processing unit and a communications unit. The processing unit may be, for example, a processor. The communications unit may be, for example, an input/output interface, a pin, or a circuit. The processing unit may execute a computer-executable instruction stored in a storage unit, so that the chip in the terminal performs the wireless communication method in any design of the first aspect. Optionally, the storage unit is a storage unit in the chip, for example, a register or a buffer, or the storage unit may be a storage unit in the terminal but outside the chip, for example, a read-only memory (read-only memory, ROM), another type of static storage device capable of storing static information and instructions, or a random access memory (random access memory, RAM).

The processor mentioned anywhere above may be a general-purpose central processing unit (CPU), a microprocessor, an application-specific integrated circuit (application-specific integrated circuit, ASIC), or one or more integrated circuits for controlling program execution of the wireless communication method according to the first aspect.

In addition, it should be noted that the apparatus embodiments described above are merely examples. The units described as separate parts may or may not be physically separate, and parts displayed as units may or may not be physical units, may be located in one position, or may be distributed on a plurality of network units. Some or all the modules may be selected according to actual needs to achieve the objectives of the solutions of the embodiments. In addition, in the accompanying drawings of the apparatus embodiments provided in this application, connection relationships between modules indicate that the modules have communication connections with each other, which may be specifically implemented as one or more communications buses or signal cables. A person of ordinary skill in the art may understand and implement the embodiments of this application without creative efforts.

Based on the description of the foregoing implementations, a person skilled in the art may clearly understand that this application may be implemented by using software in addition to necessary universal hardware, or by using dedicated hardware, including a dedicated integrated circuit, a dedicated CPU, a dedicated memory, a dedicated component, and the like. Generally, any functions that can be performed by a computer program can be easily implemented by using corresponding hardware. Moreover, a specific hardware structure used to achieve a same function may be in various forms, for example, in a form of an analog circuit, a digital circuit, or a dedicated circuit. However, for this application, software program implementation is a better implementation in more cases. Based on such an understanding, the technical solutions in this application essentially or the part contributing to the prior art may be implemented in a form of a software product. The computer software product is stored in a readable storage medium, such as a floppy disk of a computer, a USB flash drive, a removable hard disk, a read-only memory (ROM, Read-Only Memory), a random access memory (RAM, Random Access Memory), a magnetic disk, or an optical disc, and includes several instructions for instructing a computer device (which may be a personal computer, a server, a network device, and the like) to perform the methods in the embodiments of this application.

All or some of the foregoing embodiments may be implemented by using software, hardware, firmware, or any combination thereof. When software is used to implement the embodiments, the embodiments may be implemented completely or partially in a form of a computer program product.

The computer program product includes one or more computer instructions. When the computer program instructions are loaded and executed on a computer, the procedures or the functions according to the embodiments of this application are all or partially generated. The computer may be a general-purpose computer, a dedicated computer, a computer network, or another programmable apparatus. The computer instructions may be stored in a computer-readable storage medium, or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive Solid State Disk (SSD)), or the like.

What is claimed is:

1. An information sending method, comprising:
   receiving, by a terminal device, a first transport block size (TBS) value from a network device, wherein the first TBS value is included in a second TBS set, wherein the second TBS set comprises at least a TBS value 936 and a TBS value 328, and wherein the terminal device is at a coverage enhancement level 2 or a coverage enhancement level 3;
   determining, by the terminal device, a third TBS set based on the first TBS value, wherein a largest TBS value in the third TBS set is less than or equal to the first TBS value;
   selecting, by the terminal device, a TBS value from the third TBS set; and
   sending, by the terminal device, uplink information based on the selected TBS value.

2. The method according to claim 1, wherein:
   the TBS values comprised in the second TBS set are 328, 408, 504, 584, 680, 776, 840, and 936;
   the TBS values comprised in the second TBS set are 328, 408, 504, 584, 680, 776, 872, and 936;
   the TBS values comprised in the second TBS set are 328, 392, 456, 504, 600, 712, 808, and 936; or
   the TBS values comprised in the second TBS set are 328, 408, 456, 504, 600, 712, 808, and 936.

3. The method according to claim 1, wherein the third TBS set comprises a fourth TBS value, and wherein the fourth TBS value is the first TBS value, or the fourth TBS value is a TBS value closest to the first TBS value.

4. The method according to claim 3, wherein:
   the third TBS set further comprises M-1 TBSs, wherein M is a positive integer; and
   the M-1 TBSs start from the fourth TBS, and are determined, in natural descending order of TBS indexes, in a column that is in a preset TBS table and that corresponds to a quantity of physical resource blocks (PRBs);
   the M-1 TBSs start from the fourth TBS, and are determined, based on equi-spaced TBS indexes, in a column that is in a preset TBS table and that corresponds to a quantity of PRBs; or
   the M-1 TBSs start from the fourth TBS, and are determined, in head-to-tail alternate order of TBS indexes, in a column that is in a preset TBS table and that corresponds to a quantity of PRBs.

5. An information receiving method, comprising:
   selecting, by a network device for a terminal device, a first transport block size (TBS) value from a second TBS set, wherein the second TBS set comprises at least a TBS value 936 and a TBS value 328, and wherein the terminal device is at a coverage enhancement level 2 or a coverage enhancement level 3;
   determining, by the network device, a third TBS set based on the first TBS value, wherein a largest TBS value in the third TBS set is less than or equal to the first TBS value; and
   receiving, by the network device and based on the third TBS set, uplink information from the terminal device.

6. The method according to claim 5, wherein:
   the TBS values comprised in the second TBS set are 328, 408, 504, 584, 680, 776, 840, and 936;
   the TBS values comprised in the second TBS set are 328, 408, 504, 584, 680, 776, 872, and 936;
   the TBS values comprised in the second TBS set are 328, 392, 456, 504, 600, 712, 808, and 936; or
   the TBS values comprised in the second TBS set are 328, 408, 456, 504, 600, 712, 808, and 936.

7. The method according to claim 5, wherein the third TBS set comprises a fourth TBS value, and wherein the fourth TBS value is the first TBS value, or the fourth TBS is a TBS value closest to the first TBS value.

8. The method according to claim 7, wherein:
   the third TBS set further comprises M-1 TBSs, wherein M is a positive integer; and
   the M-1 TBSs start from the fourth TBS, and are determined, in natural descending order of TBS indexes, in a column that is in a preset TBS table and that corresponds to a quantity of physical resource blocks (PRBs);
   the M-1 TBSs start from the fourth TBS, and are determined, based on equi-spaced TBS indexes, in a column that is in a preset TBS table and that corresponds to a quantity of PRBs; or
   the M-1 TBSs start from the fourth TBS, and are determined, in head-to-tail alternate order of TBS indexes, in a column that is in a preset TBS table and that corresponds to a quantity of PRBs.

9. A terminal device, comprising:
   a transceiver, the transceiver configured to receive a first transport block size (TBS) value from a network device, wherein the first TBS value is included in a second TBS set, wherein the second TBS set comprises at least a TBS value 936 and a TBS value 328, and wherein the terminal device is at a coverage enhancement level 2 or a coverage enhancement level 3;
   at least one processor; and
   one or more memories coupled to the at least one processor and storing programming instructions for execution by the at least one processor to:

determine a third TBS set based on the first TBS value, wherein a largest TBS value in the third TBS set is less than or equal to the first TBS value; and select a TBS value from the third TBS set;

wherein the transceiver is further configured to send uplink information based on the selected TBS value.

10. The terminal device according to claim 9, wherein:

the TBS values comprised in the second TBS set are 328, 408, 504, 584, 680, 776, 840, and 936;

the TBS values comprised in the second TBS set are 328, 408, 504, 584, 680, 776, 872, and 936;

the TBS values comprised in the second TBS set are 328, 392, 456, 504, 600, 712, 808, and 936; or the TBS values comprised in the second TBS set are 328, 408, 456, 504, 600, 712, 808, and 936.

11. The terminal device according to claim 9, wherein the third TBS set comprises a fourth TBS value, and wherein the fourth TBS value is the first TBS value, or the fourth TBS value is a TBS value closest to the first TBS value.

12. The terminal device according to claim 11, wherein:

the third TBS set further comprises M-1 TBSs, wherein M is a positive integer; and the M-1 TBSs start from the fourth TBS, and are determined, in natural descending order of TBS indexes, in a column that is in a preset TBS table and that corresponds to a quantity of physical resource blocks (PRBs);

the M-1 TBSs start from the fourth TBS, and are determined, based on equi-spaced TBS indexes, in a column that is in a preset TBS table and that corresponds to a quantity of PRBs; or the M-1 TBSs start from the fourth TBS, and are determined, in head-to-tail alternate order of TBS indexes, in a column that is in a preset TBS table and that corresponds to a quantity of PRBs.

13. A network device, comprising:

at least one processor;

one or more memories coupled to the at least one processor and storing programming instructions for execution by the at least one processor to:

select, for a terminal device, a first transport block size (TBS) value from a second TBS set, wherein the second TBS set comprises at least a TBS value 936 and a TBS value 328, and wherein the terminal device is at a coverage enhancement level 2 or a coverage enhancement level 3; and determine a third TBS set based on the first TBS value, wherein a largest TBS value in the third TBS set is less than or equal to the first TBS value; and a transceiver, the transceiver configured to receive, based on the third TBS set, uplink information from the terminal device.

14. The network device according to claim 13, wherein:

the TBS values comprised in the second TBS set are 328, 408, 504, 584, 680, 776, 840, and 936;

the TBS values comprised in the second TBS set are 328, 408, 504, 584, 680, 776, 872, and 936;

the TBS values comprised in the second TBS set are 328, 392, 456, 504, 600, 712, 808, and 936; or the TBS values comprised in the second TBS set are 328, 408, 456, 504, 600, 712, 808, and 936.

15. The network device according to claim 13, wherein the third TBS set comprises a fourth TBS value, and wherein the fourth TBS value is the first TBS value, or the fourth TBS value is a TBS value closest to the first TBS value.

16. The network device according to claim 15, wherein:

the third TBS set further comprises M-1 TBSs, wherein M is a positive integer; and the M-1 TBSs start from the fourth TBS, and are determined, in natural descending order of TBS indexes, in a column that is in a preset TBS table and that corresponds to a quantity of physical resource blocks (PRBs);

the M-1 TBSs start from the fourth TBS, and are determined, based on equi-spaced TBS indexes, in a column that is in a preset TBS table and that corresponds to a quantity of PRBs; or the M-1 TBSs start from the fourth TBS, and are determined, in head-to-tail alternate order of TBS indexes, in a column that is in a preset TBS table and that corresponds to a quantity of PRBs.

\* \* \* \* \*